(12) United States Patent
Ogata et al.

(10) Patent No.: US 11,892,628 B2
(45) Date of Patent: Feb. 6, 2024

(54) VIDEO DISPLAY SYSTEM, VIDEO DISPLAY METHOD, AND MOVING BODY

(71) Applicant: PANASONIC INTELLECTUAL PROPERTY MANAGEMENT CO., LTD., Osaka (JP)

(72) Inventors: Masahito Ogata, Tokyo (JP); Yoshiteru Mino, Osaka (JP); Kosuke Kubota, Kanagawa (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 219 days.

(21) Appl. No.: 17/480,425

(22) Filed: Sep. 21, 2021

(65) Prior Publication Data

US 2022/0003998 A1 Jan. 6, 2022

Related U.S. Application Data

(63) Continuation of application No. PCT/JP2020/006756, filed on Feb. 20, 2020.

(30) Foreign Application Priority Data

Mar. 28, 2019 (JP) ................................ 2019-065138
Mar. 28, 2019 (JP) ................................ 2019-065139

(51) Int. Cl.
*G02B 27/01* (2006.01)
*G09G 3/02* (2006.01)
*B60K 35/00* (2006.01)

(52) U.S. Cl.
CPC .......... *G02B 27/0101* (2013.01); *B60K 35/00* (2013.01); *G09G 3/02* (2013.01);
(Continued)

(58) Field of Classification Search
CPC .............. G09G 2320/0633; G09G 2340/0442; G09G 2354/00; G09G 2360/144; G09G 2380/10
See application file for complete search history.

(56) References Cited

U.S. PATENT DOCUMENTS

2012/0069415 A1\* 3/2012 Freeman .............. G02B 27/017
359/212.1
2017/0201068 A1 7/2017 Furuya et al.

FOREIGN PATENT DOCUMENTS

JP 2008-089934 4/2008
JP 2009-255814 11/2009
(Continued)

OTHER PUBLICATIONS

Office Action from Japan Patent Office (JPO) in Japanese Patent Appl. No. 2019-065138, dated Nov. 1, 2022, together with an English language translation.
(Continued)

*Primary Examiner* — Grace Q Li
(74) *Attorney, Agent, or Firm* — Greenblum & Bernstein, P.L.C.

(57) ABSTRACT

A video display system includes: a screen on which an mage for displaying a virtual image is projected; a light source that emits laser light; a scanner that projects the image onto the screen by biaxially scanning the laser light onto the screen; and a controller that generates the image and controls the light source using an image signal for causing the generated image to be projected onto the screen by the laser light, and receives an input of sensing information measured using a temperature sensor and controls the scanner in accordance with the input sensing information. When the sensing information indicates a temperature outside a given temperature range, the controller causes the scanner to reduce an amplitude of the biaxial scanning in at least one axial direction to
(Continued)

a smaller value than when the sensing information indicates a second brightness or a temperature within the given temperature range.

10 Claims, 17 Drawing Sheets

(52) U.S. Cl.
CPC ............ *B60K 2370/152* (2019.05); *B60K 2370/178* (2019.05); *B60K 2370/333* (2019.05); *G02B 2027/014* (2013.01); *G02B 2027/0141* (2013.01); *G09G 2320/0633* (2013.01); *G09G 2340/0442* (2013.01); *G09G 2354/00* (2013.01); *G09G 2360/144* (2013.01); *G09G 2380/10* (2013.01)

(56) References Cited

FOREIGN PATENT DOCUMENTS

| | | |
|---|---|---|
| JP | 2010-243809 | 10/2010 |
| JP | 2014-058204 | 4/2014 |
| JP | 2017-125885 | 7/2017 |
| JP | 2018-140657 | 9/2018 |
| JP | 2020-112583 | 7/2020 |

OTHER PUBLICATIONS

International Search Report (ISR) from International Searching Authority (Japan Patent Office) in International Pat. Appl. No. PCT/JP2020/006756, dated May 19, 2020, together with an English language translation.

\* cited by examiner

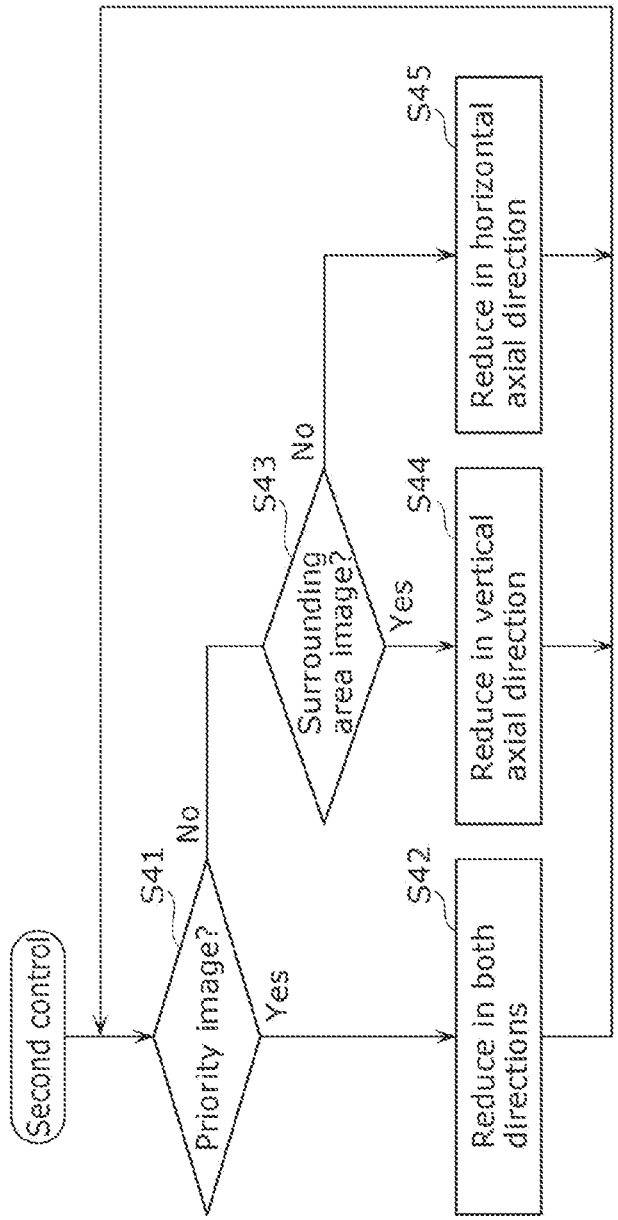

VIDEO DISPLAY SYSTEM, VIDEO DISPLAY METHOD, AND MOVING BODY

CROSS REFERENCE TO RELATED APPLICATIONS

This is a continuation application of PCT International Application No. PCT/JP2020/006756 filed on Feb. 20, 2020, designating the United States of America, which is based on and claims priority of Japanese Patent Application No. 2019-065138 filed on Mar. 28, 2019, and Japanese Patent Application No. 2019-065139 filed on Mar. 28, 2019.

FIELD

The present disclosure relates to a video display system, a video display method, and a moving body.

BACKGROUND

Patent literature (PTL) 1 discloses a projector that uses a laser as a light source. Moreover, a head-up display (hereinafter also referred to as "HUD") that directly displays information in a person's field of view by using such a projector is known.

CITATION LIST

Patent Literature

PTL 1: Japanese Unexamined Patent Application Publication No. 2010-243809

SUMMARY

Technical Problem

However, the projector according to PTL 1 can be improved upon.

In view of this, the present disclosure provides a video display system capable of improving upon the above related art.

Solution to Problem

A video display system according to one aspect of the present disclosure is a video display system in a moving body that allows a user of the moving body to view, as a virtual image, an image projected on a screen. The video display system includes: the screen on which the image to be viewed by the user as the virtual image is projected; a light source that emits laser light; a scanner that projects the image onto the screen by biaxially scanning the laser light onto the screen; and a controller that: generates the image and controls the light source using an image signal for causing the image generated to be projected onto the screen by the laser light; and receives an input of sensing information measured using a sensor and indicating a brightness of an external environment of the moving body or a temperature of the light source, and controls the scanner in accordance with the sensing information input. When the sensing information indicates a first brightness or a temperature outside a given temperature range, the controller causes the scanner to reduce an amplitude of the biaxial scanning in at least one axial direction of the biaxial scanning to a smaller value than when the sensing information indicates a second brightness darker than the first brightness or a temperature within the given temperature range.

A video display method according to one aspect of the present disclosure is a video display method executed in a video display system in a moving body that allows a user of the moving body to view, as a virtual image, an image projected on a screen. The video display method includes: generating an image signal indicating the image to be projected onto the screen; emitting laser light in accordance with the image signal generated; projecting the image onto the screen by biaxially scanning the laser light onto the screen, the image being viewed by the user of the moving body as the virtual image; obtaining sensing information indicating a brightness of an external environment of the moving body measured using a sensor or a temperature of a light source that emits the laser light measured using a sensor; and when the sensing information indicates a first brightness or a temperature outside a given temperature range, reducing an amplitude of the biaxial scanning in at least one axial direction of the biaxial scanning to a smaller value than when the sensing information indicates a second brightness darker than the first brightness or a temperature within the given temperature range.

General or specific aspects of the present disclosure may be realized as a system, a method, an integrated circuit, a computer program, a non-transitory computer-readable recording medium such as a compact disc-read only memory (CD-ROM), or any given combination thereof.

Advantageous Effects

With the video display system according to the present disclosure, it is possible to inhibit a reduction in visibility of the virtual image by the user.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 22 is a flow chart illustrating one example of the second control performed by the video display system.

DESCRIPTION OF EMBODIMENT(S)

Underlying Knowledge of the Inventors

Figure 1:
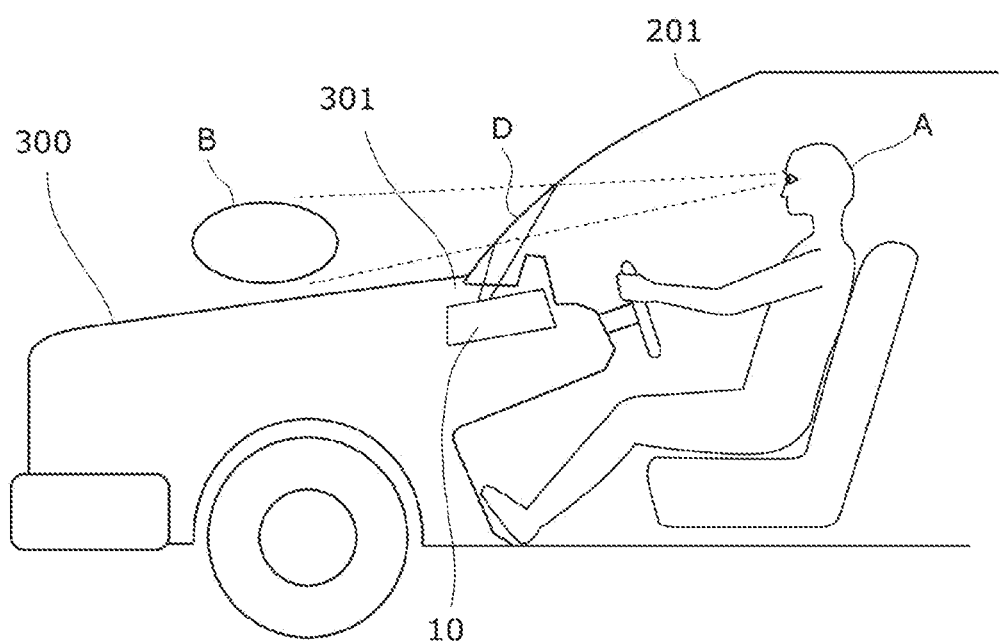
FIG. 1 illustrates an example of an application of a video display system according to an embodiment in a vehicle.

The inventors arrived at the following knowledge in relation to the technique described in the background section above.

The light source of the projector disclosed in PTL 1 is a laser light source. One problem with laser light sources is a reduction in luminance of the virtual image formed in front of the windshield caused by a reduction in light output at high or low temperatures, which leads to reduction in visibility by the user. In order to overcome this problem, it is conceivable to adjust the temperature of the light source using a heater and/or Peltier device or the like, but when, for example, the operating temperature decreases below and increases above a given temperature range, it takes time to adjust the temperature back to an appropriate temperature at which the output of the light source does not decrease, so there is a problem with the responsiveness.

The projector according to PTL 1 has a problem whereby the contrast between the virtual image formed in front of the windshield that is presented to the user and the real-world background that forms the background of the virtual image decreases as the brightness of the external environment of the vehicle increases, which reduces the visibility of the virtual image by the user.

In view of this, the inventors discovered a video display system that can inhibit a reduction in the luminance of the virtual image even under conditions in which the contrast between the virtual image and the real-world background easily decreases and conditions in which the output of the light source decreases due to a decrease or increase in temperature. In other words, the inventors discovered a video display system and the like that are capable of inhibiting a reduction in visibility of a virtual image by the user.

A video display system according to one aspect of the present disclosure is a video display system in a moving body that allows a user of the moving body to view, as a virtual image, an image projected on a screen. The video display system includes: the screen on which the image to be viewed by the user as the virtual image is projected; a light source that emits laser light; a scanner that projects the image onto the screen by biaxially scanning the laser light onto the screen; and a controller that: generates the image and controls the light source using an image signal for causing the image generated to be projected onto the screen by the laser light; and receives an input of sensing information measured using a sensor and indicating a brightness of an external environment of the moving body or a temperature of the light source, and controls the scanner in accordance with the sensing information input. When the sensing information indicates a first brightness or a temperature outside a given temperature range, the controller causes the scanner to reduce an amplitude of the biaxial scanning in at least one axial direction of the biaxial scanning to a smaller value than when the sensing information indicates a second brightness darker than the first brightness or a temperature within the given temperature range.

Accordingly, even in conditions in which the external environment is, for example, brighter than a given threshold and the contrast between the virtual image and the real-world background tends to decrease, or even when the temperature of the light source is a temperature at which sufficient light output is difficult to obtain, the density of laser light per unit amount of scanning can be increased by reducing the amplitude of the scanning by the scanner. This restores the brightness of the virtual image, making it possible to display a clear image. Accordingly, it is possible to inhibit a reduction in visibility of the virtual image by the user.

Moreover, when the sensing information indicates the first brightness or a temperature outside the given temperature range, the controller may generate the image by enlarging an image of a same type displayed at a same position in the virtual image regardless of the brightness or the temperature indicated by the sensing information in an axial direction in which the amplitude of the biaxial scanning is to be reduced by the scanner to a greater size than when the sensing information indicates the second brightness or a temperature within the given temperature range.

Accordingly, even when the brightness of the virtual image is restored by reducing the amplitude of the scanning by the scanner, the size of the virtual image can be inhibited from decreasing.

Moreover, an enlargement ratio of the image generated may be a reciprocal of a reduction ratio of the amplitude to be reduced.

Accordingly, even when the brightness of the virtual image is restored by reducing the amplitude of the scanning by the scanner, the size of the virtual image can be made to be the same size as before the reduction of the amplitude.

Moreover, when the sensing information indicates the first brightness or a temperature outside the given temperature range, the controller may cause the scanner to reduce, with reference to a center of a region in which the scanner scans the laser light, the amplitude of the biaxial scanning in both a horizontal axial direction and a vertical axial direction of the biaxial scanning to a smaller value than when the sensing information indicates the second brightness or a temperature within the given temperature range. The image to be projected onto the screen may include a priority image whose priority of being displayed to the user of the moving body is set higher than other images.

Accordingly, the brightness of a priority image displayed in the center can be effectively inhibited from being reduced.

Moreover, the priority image may be an image for displaying a warning to the user.

Accordingly, the brightness of an image for displaying a warning that is displayed in the center can be effectively inhibited from being reduced.

Moreover, when the sensing information indicates a temperature outside the given temperature range, the controller may cause the scanner to reduce, with reference to a horizontal center of a region in which the scanner scans the laser light, the amplitude of the biaxial scanning in a horizontal axial direction of the biaxial scanning to a smaller value than when the sensing information indicates a temperature within the given temperature range. The image to be projected onto the screen may include an always-displayed image set to be always displayed while the moving body is operating.

Accordingly, since the virtual image can be displayed across the entire vertical axis of the region, it is possible to effectively inhibit a reduction in brightness of, for example, an always-displayed image, which is often displayed in the lower part of the display region, with minimal change in size to the always-displayed image.

Moreover, the always-displayed image may be an image displaying an operating status of the moving body.

Accordingly, it is possible to effectively inhibit a reduction in brightness of an image displaying an operating status of the moving body with minimal change in size to the image.

Moreover, when the sensing information indicates the first brightness or a temperature outside the given temperature range, the controller may cause the scanner to reduce, with reference to a vertical center of a region in which the scanner scans the laser light, the amplitude of the biaxial scanning in a vertical axial direction of the biaxial scanning to a smaller value than when the sensing information indicates the second brightness or a temperature within the given temperature range. The image to be projected onto the screen may include a surrounding area image which is set to be displayed offset toward one horizontal axis end of a region of the screen scanned by the scanner when the sensing information indicates the second brightness or a temperature within the given temperature range.

Accordingly, it is possible to effectively inhibit a reduction in brightness of a surrounding area image, which is easy to display on the left and right ends, with minimal change in size to the surrounding area image.

Moreover, the surrounding area image may be an image displaying an object located left or right of a course of travel of the moving body.

Accordingly, it is possible to effectively inhibit a reduction in brightness of an image displaying an object located left or right of a course of travel of the moving body with minimal change in size to the image.

A video display method according to one aspect of the present disclosure is a video display method executed in a video display system in a moving body that allows a user of the moving body to view, as a virtual image, an image projected on a screen. The video display method includes: generating an image signal indicating the image to be projected onto the screen; emitting laser light in accordance with the image signal generated; projecting the image onto the screen by biaxially scanning the laser light onto the screen, the image being viewed by the user of the moving body as the virtual image; obtaining sensing information indicating a brightness of an external environment of the moving body measured using a sensor or a temperature of a light source that emits the laser light measured using a sensor; and when the sensing information indicates a first brightness or a temperature outside a given temperature range, reducing an amplitude of the biaxial scanning in at least one axial direction of the biaxial scanning to a smaller value than when the sensing information indicates a second brightness darker than the first brightness or a temperature within the given temperature range.

Accordingly, even in conditions in which the external environment is, for example, brighter than a given threshold and the contrast between the virtual image and the real-world background tends to decrease, or even when the temperature of the light source is a temperature at which sufficient light output is difficult to obtain, the density of laser light per unit amount of scanning can be increased by reducing the amplitude of the scanning by the scanner. This restores the brightness of the virtual image, making it possible to display a clear image. Accordingly, it is possible to inhibit a reduction in visibility of the virtual image by the user.

General or specific aspects of the display apparatus may be realized as a moving body including the video display system, a method, an integrated circuit, a computer program, a non-transitory computer-readable recording medium such as a CD-ROM, or any given combination thereof.

Hereinafter, the display apparatus according to an embodiment will be described with reference to the drawings. The display apparatus according to the following embodiment is a general or specific example. The numerical values, shapes, materials, elements, the arrangement and connection of the elements, steps, order of the steps, etc., shown in the following embodiment are mere examples, and therefore do not limit the scope of the claims. Therefore, among elements in the following exemplary embodiment, those not recited in any of the independent claims defining the broadest scope are described as optional elements.

Embodiment

[1-1. Outline Configuration of Video Display System]

Figure 2:
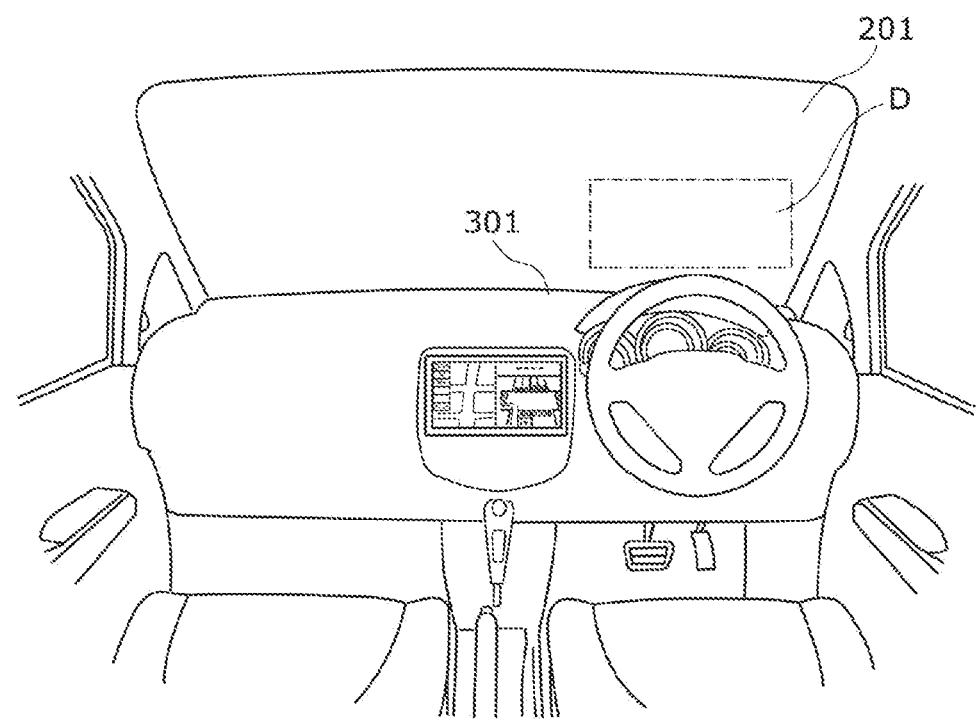
FIG. 2 illustrates one example of the region in which the video display system illustrated in FIG. 1 displays an image on the windshield.
Figure 3:
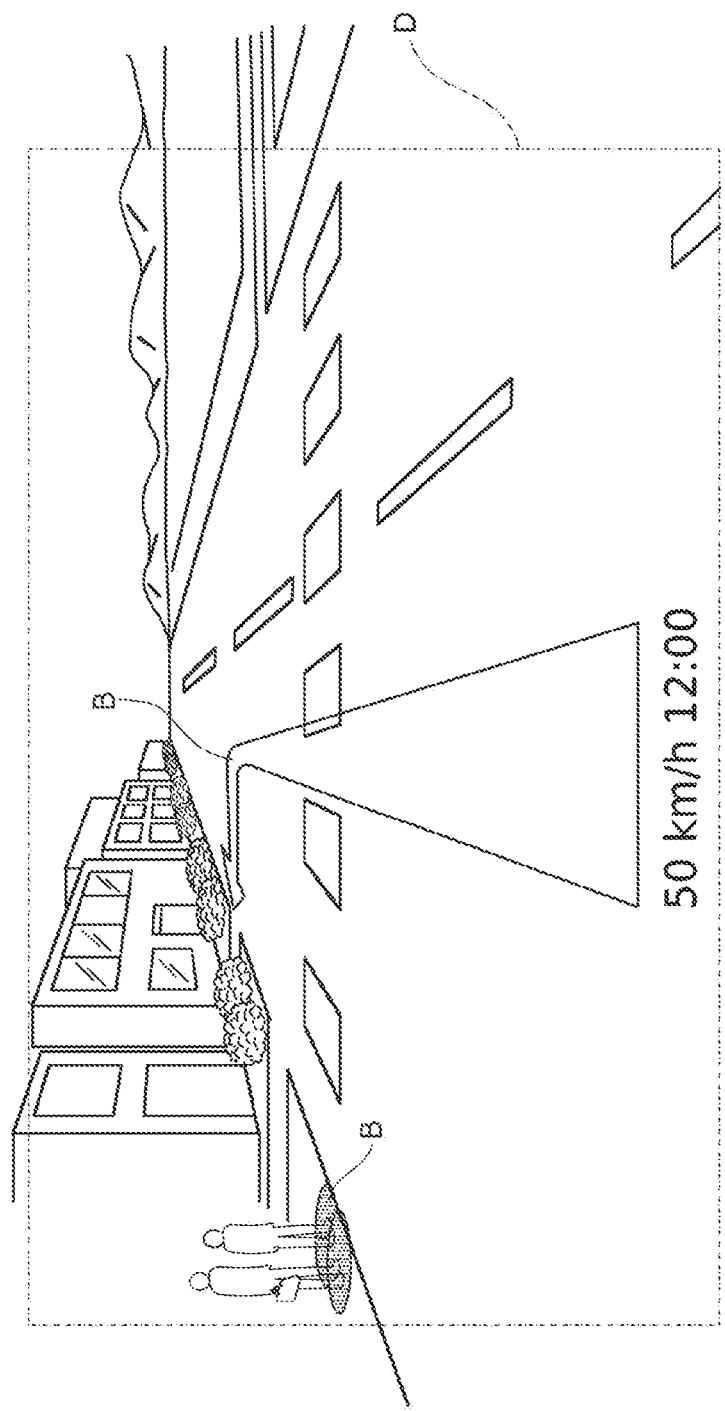
FIG. 3 illustrates one example of an image displayed by the video display system illustrated in FIG. 1.

An outline of the configuration of video display system 10 according to the embodiment will be described with reference to FIG. 1 through FIG. 3, Although the following will describe an example in which video display system 10 is implemented as a head-up display (HUD) in vehicle 300, which is one example of a moving body, video display system 10 is not limited to being provided in a vehicle. FIG. 1 illustrates an example of an application of video display system 10 according to the embodiment in vehicle 300. FIG. 2 illustrates one example of the region in which video display system 10 illustrated in FIG. 1 displays an image on windshield 201. FIG. 3 illustrates one example of an image displayed by video display system 10 illustrated in FIG. 1.

As illustrated in FIG. 1, video display system 10 according to the embodiment is configured as an in-vehicle HUD, and is attached below windshield 201 of vehicle 300, specifically in the vicinity of the top surface of dashboard 301. In this embodiment, windshield 201 is exemplified as the front windshield glass, but may be windshield glass provided anywhere.

As illustrated in FIG. 1 and FIG. 2, video display system 10 is configured to project light that forms virtual image B onto region D of windshield 201 acting as a display medium. The projected light reflects off windshield 201 toward the face of driver A of vehicle 300 and is viewed by driver A. Driver A is a user of video display system 10 that sits in the driver's seat of vehicle 300. Driver A perceives virtual image B as an image present outside the vehicle on the other side of windshield 201 as the foreground of the forward-facing view seen through windshield 201, that is, as the foreground against a background of actual objects.

In the following description, the viewing of virtual image B by driver A as a result of video display system 10 projecting light onto windshield 201 may be phrased as video display system 10 displaying virtual image B using windshield 201. Note that the display medium of video display system 10 is not limited to windshield 201; the display medium of video display system 10 may be any display medium that allows the user to view the reflected light projected by video display system 10.

As illustrated in FIG. 1 through FIG. 3, video display system 10, for example, projects light onto display region D, which is the region enclosed by the dash-dotted line on windshield 201. Display region D is located toward the bottom of the area directly in front of driver A on windshield 201. Driver A sitting in the driver's seat views the image formed by the light projected onto display region D as virtual image B appearing outside the vehicle on the other side of windshield 201.

[1-2. Configuration of Video Display System]

Figure 4:
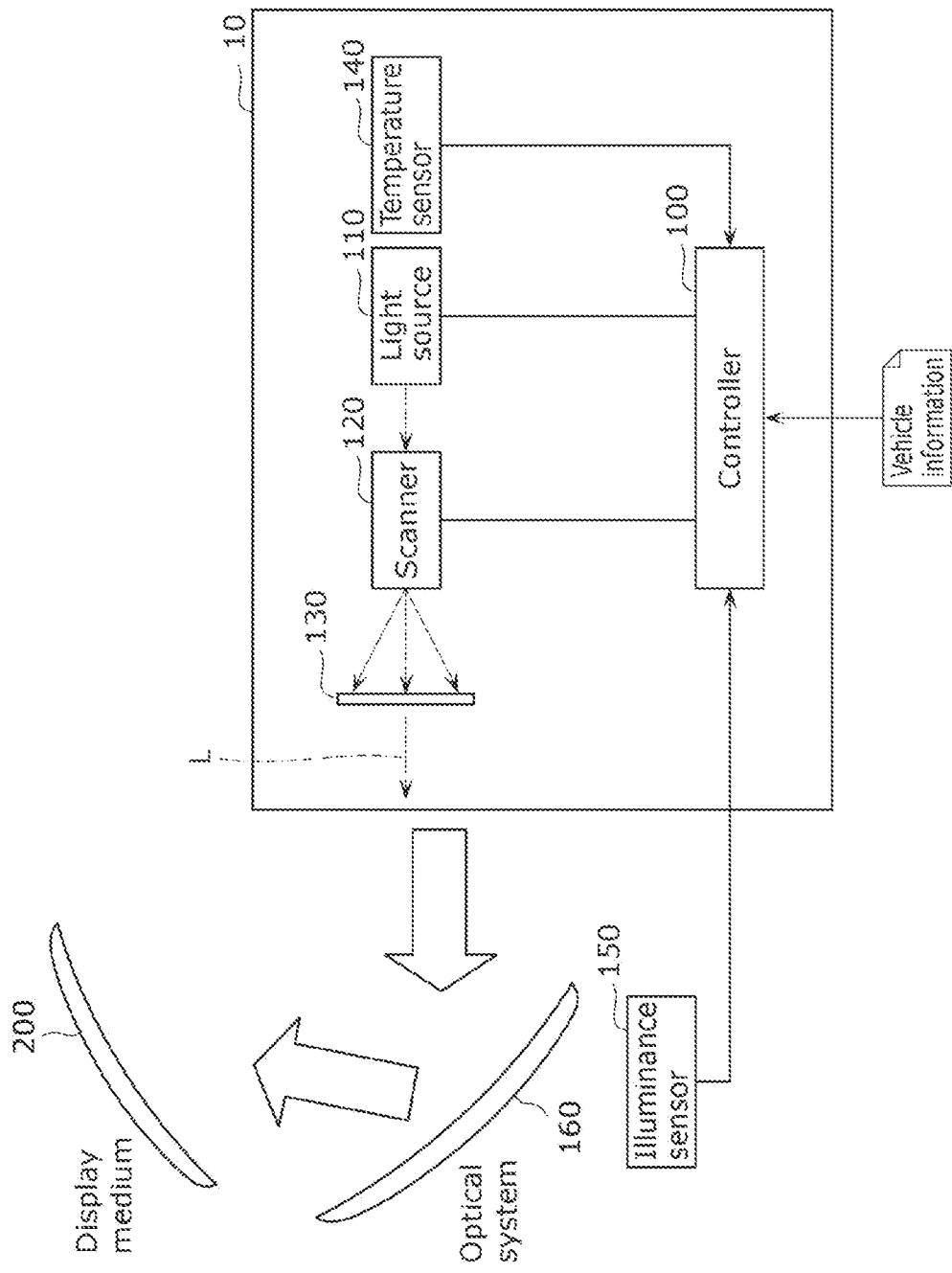
FIG. 4 is a block diagram illustrating one example of the functional configuration of a display apparatus according to the embodiment.
Figure 5:
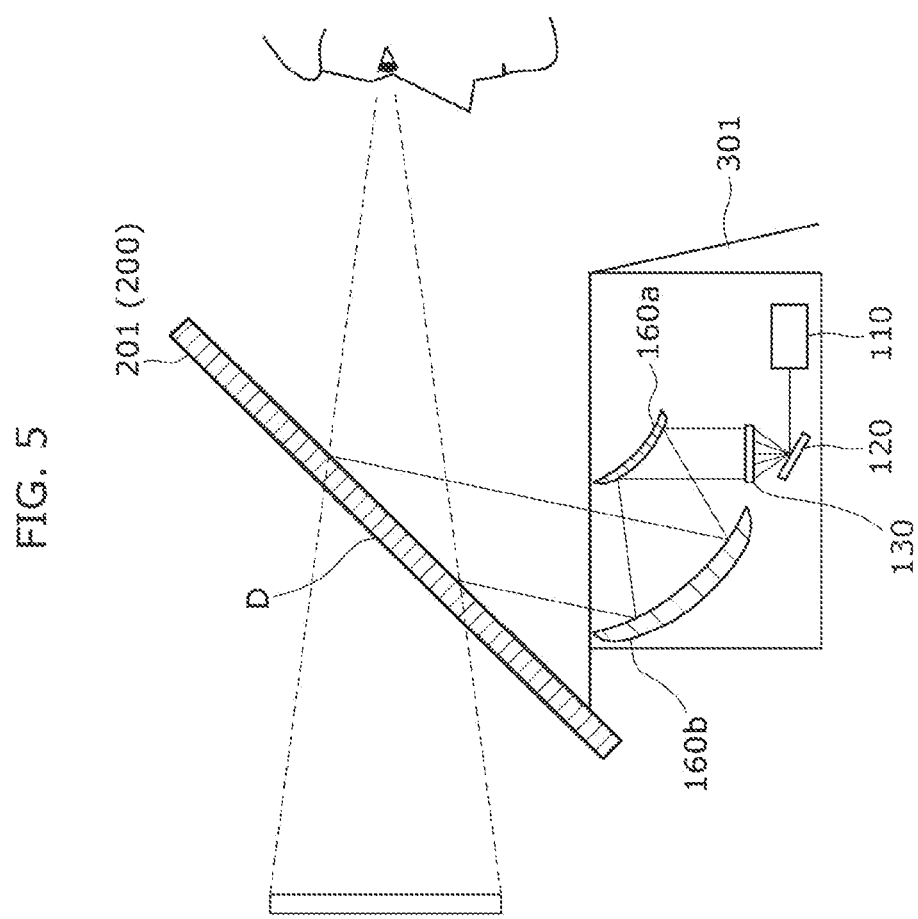
FIG. 5 illustrates one example of a configuration in which the video display system illustrated in FIG. 4 is provided in a vehicle.

The configuration of video display system 10 according to the embodiment will be described in greater detail with reference to FIG. 4 and FIG. 5. FIG. 4 is a block diagram illustrating one example of the functional configuration of video display system 10 according to the embodiment. FIG. 5 illustrates one example of a configuration in which video display system 10 illustrated in FIG. 4 is provided in vehicle 300.

As illustrated in FIG. 4 and FIG. 5, video display system 10 includes light source 110, scanner 120, screen 130, temperature sensor 140, illuminance sensor 150, and controller 100. The dash-dotted arrow lines starting at light source 110 in FIG. 4 indicate individual light paths in video display system 10. Specifically, the dash-dotted arrow lines indicate a path of projected light from light source 110 to scanner 120 and individual paths of scanned light from scanner 120 to screen 130.

Light source 110 emits light for forming the virtual image. The light emitted by light source 110 is projected onto windshield 201, i.e., display medium 200, which forms the virtual image visible to driver A. For example, light source 110 is configured as a projector including semiconductor laser light sources that emit red (R), green (G), and blue (b) laser light as light emitters, Such a projector is capable of forming a highly visible virtual image. Moreover, video display system 10 including semiconductor laser light sources can have a compact configuration, keeping the space occupied by video display system 10 on dashboard 301 to a minimum.

Scanner 120 is disposed on the path of projected light from light source 110, Scanner 120 emits laser light received from light source 110 onto screen 130 as scanned light, and it is with this scanned light that the scanning of screen 130 is performed. More specifically, scanner 120 projects an image onto screen 130 by biaxially scanning laser light. Scanner 120 can emit received light as scanned light in an arbitrary direction, and is implemented as, for example, micro-electro-mechanical systems (MEMS) mirror. The light scanned by scanner 120 forms an image for being displayed as the virtual image on screen 130. Since scanner 120 biaxially scans the light onto screen 130, this achieves two-dimensional scanning. This scanning is, for example, a raster scan in which horizontal sweeps are made line by line, transitioning to the next vertical position with each line.

Screen 130 is a component for the image for displaying the virtual image to be projected on. In this embodiment, screen 130 is exemplified as a rectangular plate-shaped, sheet-shaped, or film-shaped component, but the shape of screen 130 is not limited to this example. Screen 130 is configured so that light that reaches screen 130 can form an image on screen 130. Although screen 130 is exemplified as being configured of a material that can transmit light in this embodiment, screen 130 may be configured of a material that reflects light. Screen 130 that can transmit light is, for example, configured of a transparent material. For example, screen 130 may be a diffusion screen. Screen 130 projects, onto optical system 160, the image formed on screen 130 by the light scanned by scanner 120. Screen 130 is disposed inside the area of emission of light scanned by scanner 120, that is to say, within the scanning area of scanner 120.

Temperature sensor 140 is a sensor that is disposed in the vicinity of light source 110 and detects the temperature in the vicinity of light source 110. However, temperature sensor 140 may be disposed in contact with light source 110 and detect the temperature of light source 110. For example, temperature sensor 140 may be a thermistor or the like. Sensing information indicating the temperature of light source 110 measured using temperature sensor 140 is output to controller 100.

Illuminance sensor 150 is a sensor that is disposed on dashboard 301 and detects the brightness of the external environment of vehicle 300. However, so long as illuminance sensor 150 can detect the brightness of the external environment of vehicle 300, illuminance sensor 150 need not be disposed on dashboard 301. Sensing information indicating the brightness of the external environment measured using illuminance sensor 150 is output to controller 100.

Optical system 160 projects, onto display region D of windshield 201 acting as display medium 200, the image projected onto optical system 160 by screen 130. Optical system 160 may include a mirror that reflects light and/or a lens or the like that enlarges or reduces light passing therethrough. In this embodiment, optical system 160 includes a mirror such as a concave mirror, a convex mirror, or a planar mirror. More specifically, as illustrated in FIG. 5, optical system 160 includes two mirrors 160a and 160b. Mirrors 160a and 160b may be compact mirrors that fit within the enclosure (not illustrated) of the compact video display system 10. Mirrors 160a and 160b are disposed across from one another. In this embodiment, mirror 160a is exemplified as a convex mirror and mirror 160b is exemplified as a concave mirror, but each of mirror 160a and 160b may be any one of a planar mirror, a convex mirror, and a concave mirror.

The image formed on screen 130 is projected toward first mirror 160a. The image projected onto first mirror 160a is reflected and enlarged by first mirror 160a and projected onto second mirror 160b. The image projected onto second mirror 160b is further reflected and enlarged by second mirror 160b and projected onto display medium 200, By using mirrors 160a and 160b, each of the images is projected in a desired direction while being enlarged. Although display medium 200 has, in the case of windshield 201, a curved display surface, by using the curved mirrors mirror 160a and 160b, the distortion of the image projected onto the display surface can be adjusted. Note that optical system 160 may include a lens, and the lens may adjust the enlargement and orientation of the image. All or part of optical system 160 may be included as elements in video display system 10.

Controller 100 controls the entire video display system 10. For example, controller 100 receives vehicle information from an external device, and calculates the image to be displayed as the virtual image and the position thereof based on the obtained vehicle information. The external device may be, for example, an in-vehicle car navigation system, a speedometer, a water temperature gauge, a human detector, and eye position detector, or an obstacle detector or the like.

Controller 100 outputs information indicating the calculation result to light source 110 as a signal, and controls the emission of light by light source 110. Specifically, controller 100 generates an image, and controls light source 110 using an image signal for causing the generated image to be projected onto screen 130 by the laser light.

Controller 100 also outputs a control signal to scanner 120 and controls the operation of scanner 120. Specifically, controller 100 receives an input of sensing information from temperature sensor 140 or illuminance sensor 150, and controls scanner 120 in accordance with the input sensing information. Controller 100 controls scanner 120 in accordance with the temperature indicated by sensing information and/or controls scanner 120 in accordance with the brightness indicated by the sensing information.

For example, when the sensing information indicates a temperature outside a given temperature range, controller 100 causes scanner 120 to reduce the amplitude of the biaxial scanning in at least one axial direction thereof to a smaller value than when the sensing information indicates a temperature within the given temperature range. In other words, when the temperature of light source 110 is within a given temperature range, controller 100 performs first control that sets the amplitude of the scanning by scanner 120 to a normal value, and when the temperature of light source 110 is outside the given temperature range, controller 100 performs second control that sets the amplitude of the scanning by scanner 120 to a value smaller than the normal value in the first control.

When the sensing information indicates a temperature outside the given temperature range, controller 100 generates the image by enlarging an image of the same type displayed at the same position in the virtual image regardless of the temperature indicated by the sensing information in an axial direction in which the amplitude of the biaxial scanning is to be reduced by the scanner to a greater size than when the sensing information indicates a temperature within the given temperature range. Here, the same type of image means images of the same type from among various types of images including an image for displaying speed indicating the driving speed of vehicle 300, an image for displaying the rotational speed of the engine (motor), and an image displaying the fuel meter.

Next, the given temperature range will be described with reference to FIG. 6 through FIG. 8.

Figure 6:
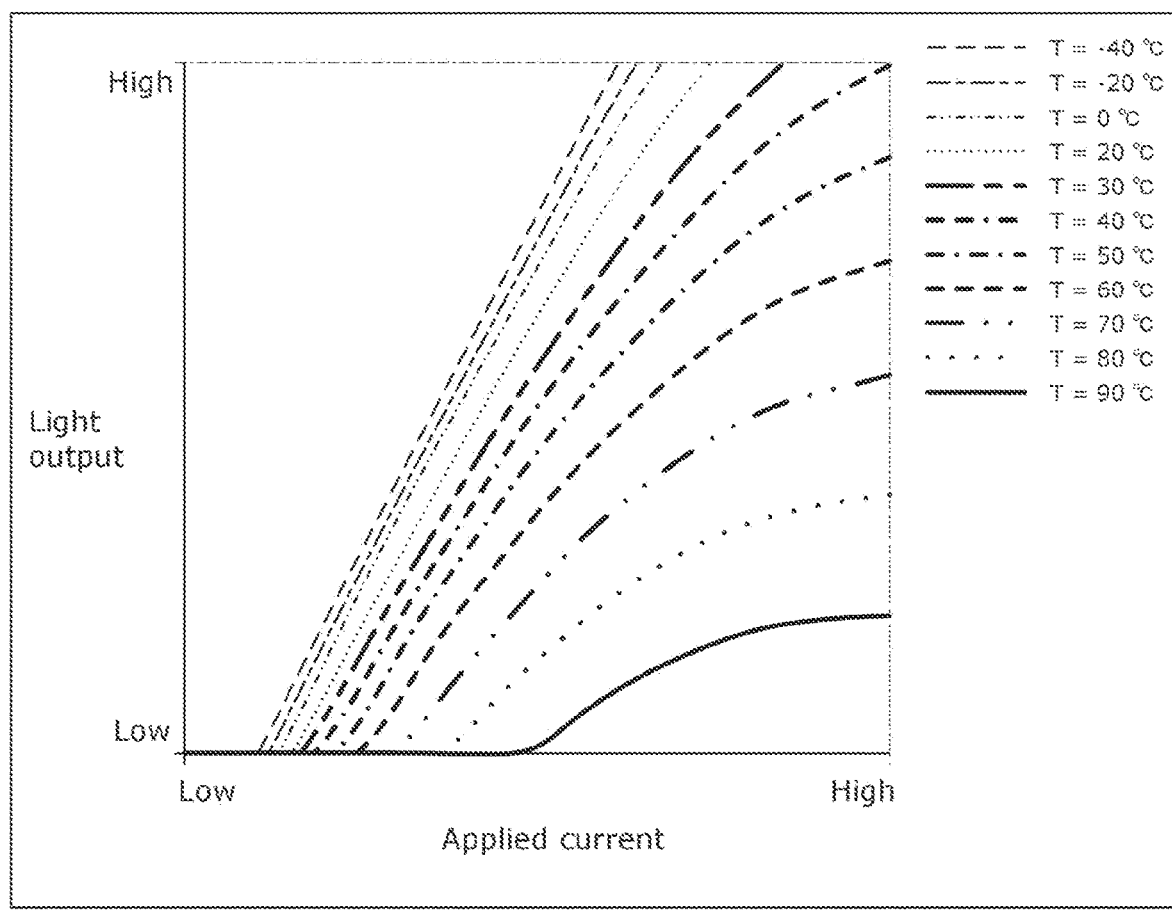
FIG. 6 illustrates the relationship between applied current and light output (I-L curve) for a semiconductor laser light source.

FIG. 6 illustrates the relationship between applied current and light output (I-L curve) for the semiconductor laser light source. In FIG. 6, I-L curves for different temperatures are illustrated.

As illustrated in FIG. 6, the higher the temperature, the lower the light output relative to the same applied current. In other words, the higher the temperature, the harder it is to obtain sufficient light output for displaying the virtual image, even if the applied current is increased. Moreover, a high current flow increases the risk of catastrophic optical damage to the semiconductor laser light source, shortening the lifespan of the semiconductor laser light source. In order to prevent the lifespan from shortening, the current that flows to the semiconductor laser light source at high temperatures is restricted to prevent a high current flow.

In contrast, at low temperatures, sufficient light is relatively easy to achieve even without having to increase the applied current very high, but excessive light output may &so contribute to catastrophic optic& damage. Accordingly, just like at high temperatures, the current that flows to the semiconductor laser light source at low temperatures as well is restricted to prevent excessive light output.

Figure 7:
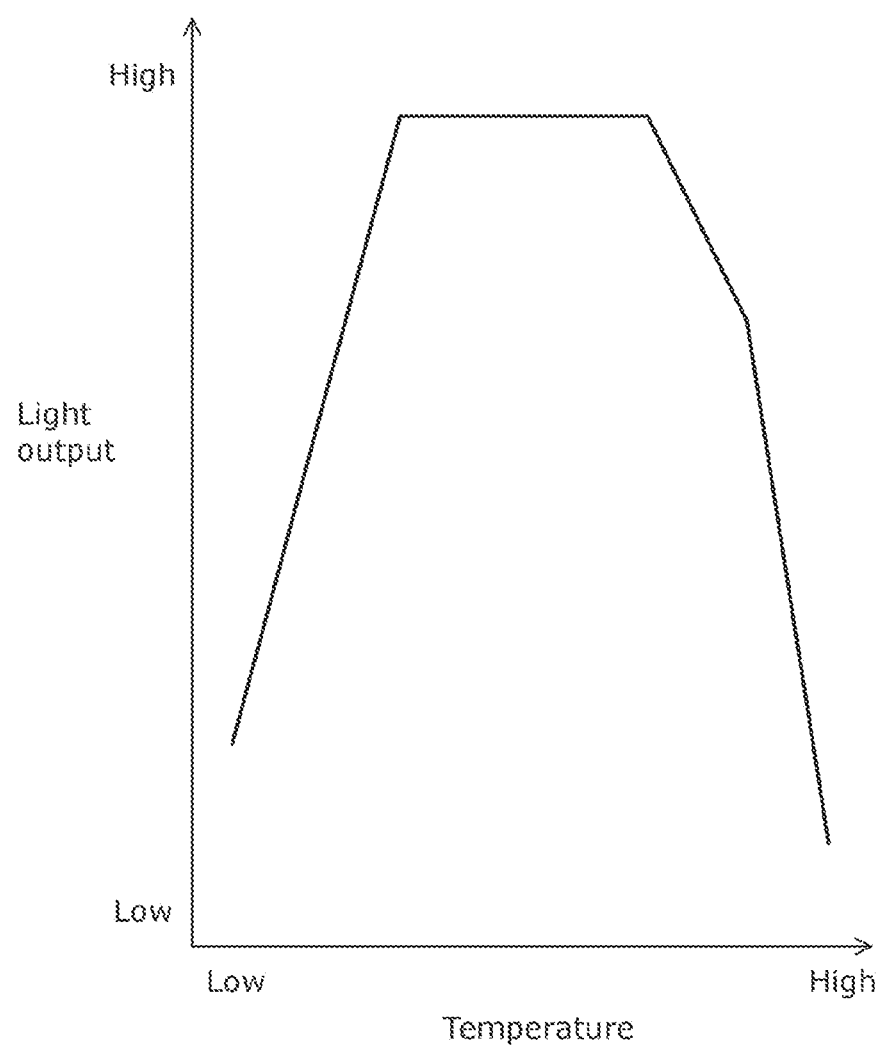
FIG. 7 is a graph of the amount of light that the semiconductor laser light source is permitted to output depending on temperature.
Figure 8:
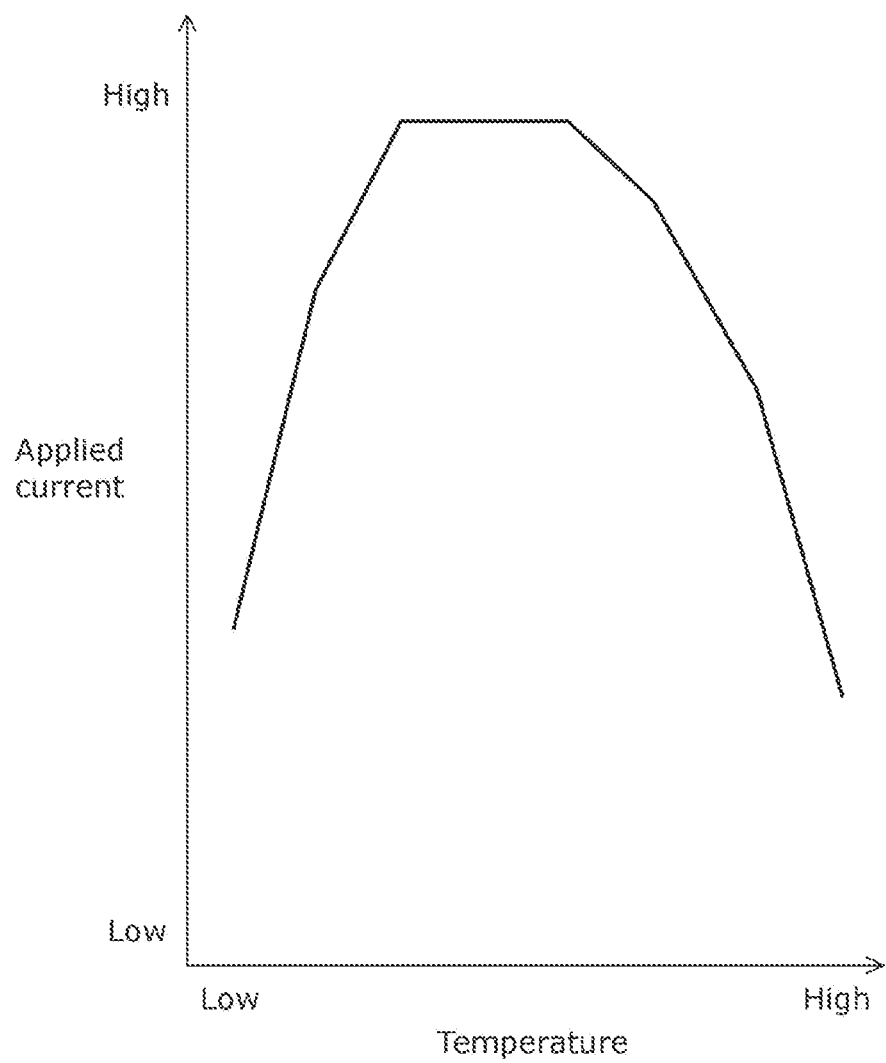
FIG. 8 is a graph of the amount of current that is permitted to be applied to the semiconductor laser light source depending on temperature.

FIG. 7 is a graph of the amount of light that the semiconductor laser light source is permitted to output depending on temperature. FIG. 8 is a graph of the amount of current that is permitted to be applied to the semiconductor laser light source depending on temperature.

As illustrated in FIG. 7, in 0 to 60 degree environments, the semiconductor laser light source needs to be managed in order to achieve maximum light output. As illustrated in FIG. 8, in 0 to 40 degree environments, the semiconductor laser light source needs to be managed in order to apply maximum current. As this shows, in order to achieve sufficient light output from the semiconductor laser light source, there are upper and lower temperature range limits. Based on the above, the given temperature range may be set to a temperature range for achieving, from the semiconductor laser light source, sufficient light output for displaying the virtual image.

For example, when the sensing information indicates the first brightness, controller 100 causes scanner 120 to reduce the amplitude of the biaxial scanning in at least one axial direction thereof to a smaller value than when the sensing information indicates a second brightness darker than the first brightness. In other words, when the brightness of the external environment is equal to or darker than a brightness indicated by a predetermined threshold, controller 100 performs the first control that sets the amplitude of the scanning by scanner 120 to a normal value, and when the brightness of the external environment is brighter than the brightness indicated by the predetermined threshold, controller 100 performs the second control that sets the amplitude of the scanning by scanner 120 to a value smaller than the normal value in the first control.

Note that performing the second control causes the luminance of the virtual image viewed by the user to increase, so the luminance of the displayed virtual image directly after the second control is performed is greater than the luminance of the displayed virtual image directly before the second control is performed. Accordingly, when switching from the first control to the second control, controller 100 may perform control for reducing the magnitude of the light output by light source 110. This makes it possible to maintain the luminance of the virtual image viewed by the user at a constant value even when the control is switched from the first control to the second control. This in turn reduces the sense of something being amiss that is parted on the user.

On the other hand, when switching from the second control to the first control, controller 100 may perform control for increasing the magnitude of the light output by light source 110. This makes it possible to maintain the luminance of the virtual image viewed by the user at a constant value even when the control is switched from the second control to the first control. This in turn reduces the sense of something being amiss that is parted on the user.

When the sensing information indicates the first brightness, controller 100 generates the image by enlarging an image of the same type displayed at the same position in the virtual image regardless of the brightness indicated by the sensing information in an axial direction in which the amplitude of the biaxial scanning is to be reduced by the scanner to a greater size than when the sensing information indicates the second brightness. Here, the "same type of image" has the same meaning as described above.

There are instances in which control of light source 110 and control of scanner 120 by controller 100 are performed independently, but adjustments such as synchronization between the two may also be included. Controller 100 may be configured as a computer system (not illustrated) including, for example, a central processing unit (CPU), random access memory (RAM), and read-only memory (ROM), Some or all of the functions of controller 100 may be achieved by the CPU executing a program recorded in the ROM, using the RAM as memory for its work. Moreover, some or all of the functions of controller 100 may be achieved by dedicated hardware circuitry. Note that controller 100 may be configured as a stand-alone element that performs centralized control, and may be configured as a plurality of elements that work together to perform decentralized control. Although controller 100 is exemplified as an element included in video display system 10 in this embodiment, controller 100 may be an element included in an external device.

Hereinafter, specific examples of the control of light source 110 and scanner 120 by controller 100 will be given with reference to the drawings.

FIRST EXAMPLE

First, a first example will be given.

Figure 9:
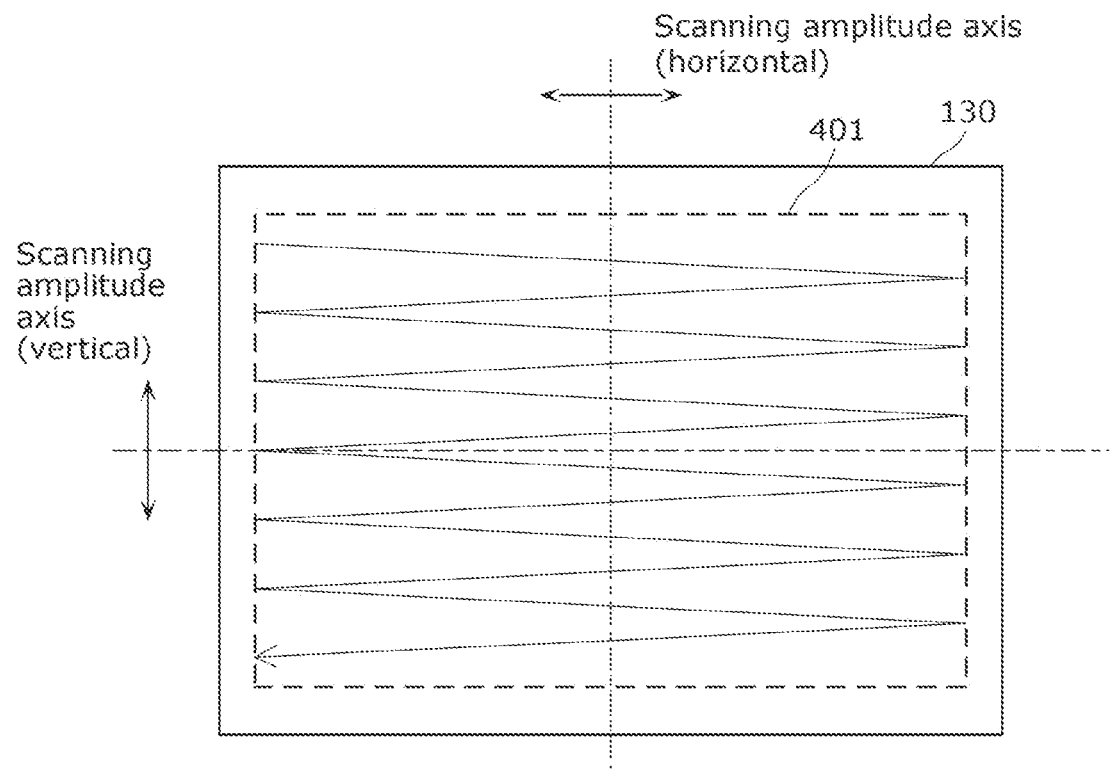
FIG. 9 illustrates one example of the amplitude of scanning by a scanner under first control.
Figure 10:
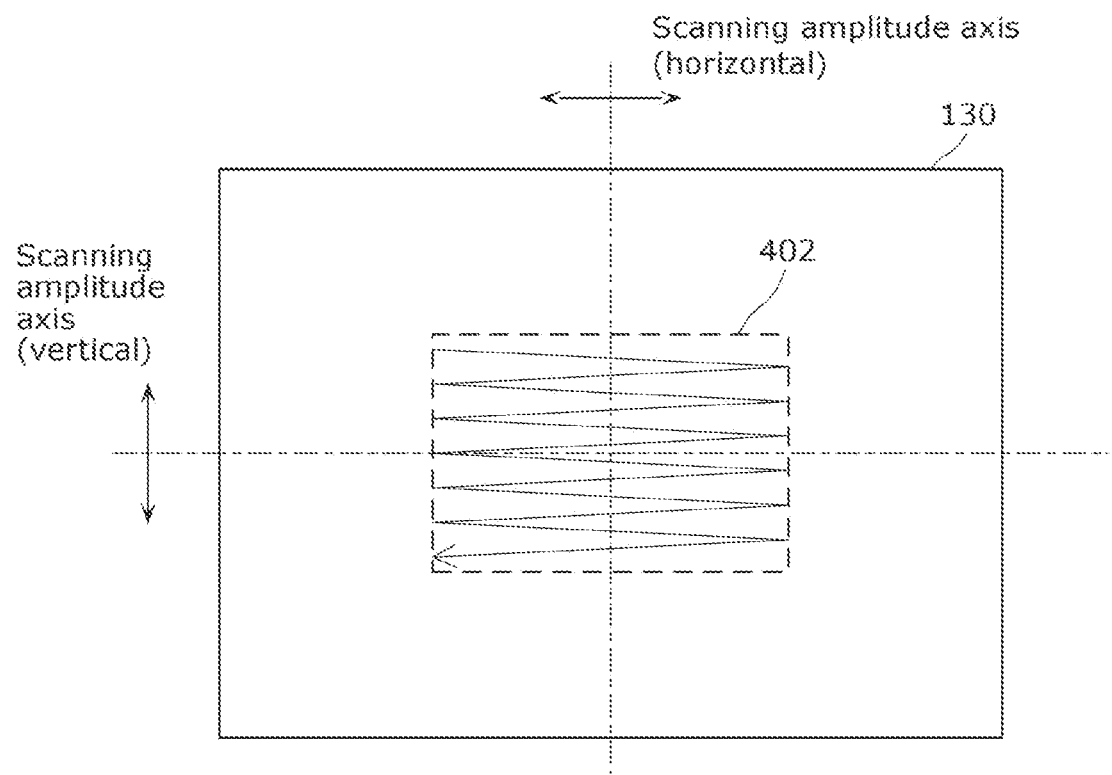
FIG. 10 illustrates a first example of the amplitude of the scanning by the scanner under second control.

FIG. 9 illustrates one example of the amplitude of the scanning by the scanner under the first control. FIG. 10 illustrates a first example of the amplitude of the scanning by the scanner under the second control.

The size of region 401 corresponding to the amplitude under the first control is, for example, smaller than the size of screen 130 by a predefined ratio based on the size of screen 130. The size of region 402 corresponding to the amplitude under the second control is smaller than the size of region 401 corresponding to the amplitude under the first control, and is, for example, half the size of region 401 in both the horizontal and vertical axial directions of the scanning. Note that the ratio of reduction is not limited to one half, and may be two thirds, three fourths, or any other ratio less than one. In the second control, controller 100 causes scanner 120 to reduce, with reference to the center of the region in which scanner 120 scans the laser light, the amplitude of the biaxial scanning in both the horizontal and vertical axial directions thereof to a smaller value than in the first control. In other words, the entirety of region 402 of screen 130 in which scanner 120 scans the laser light in the second control overlaps region 401 of screen 130 in which scanner 120 scans the laser light in the first control, including the center of region 401, and is smaller than region 401 in both the horizontal and vertical axial directions.

Figure 11:
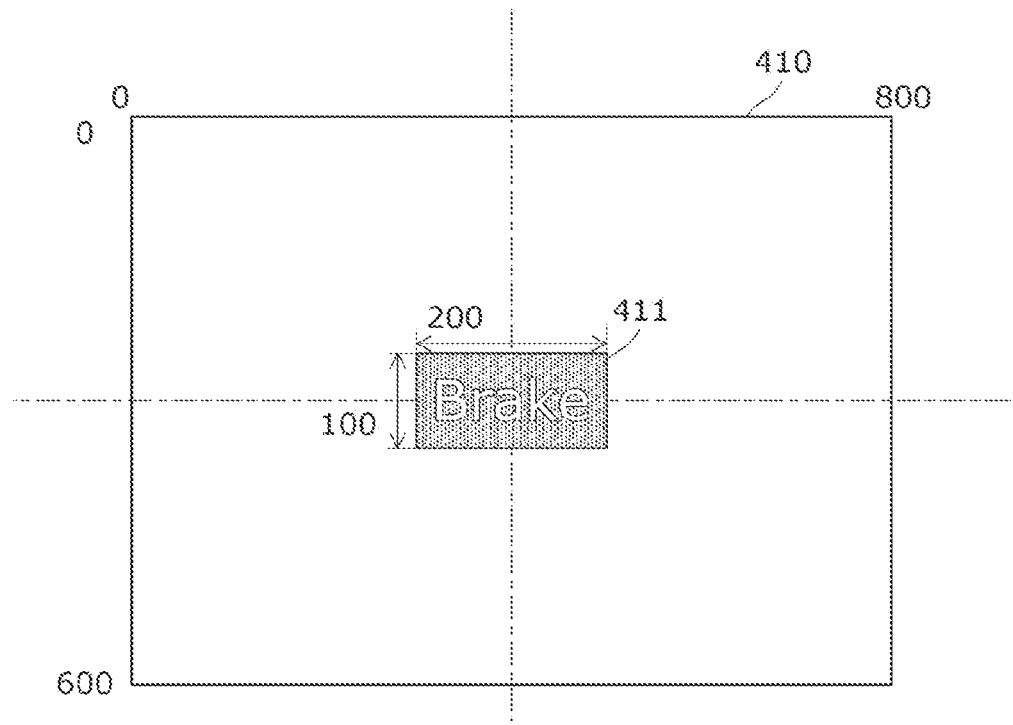
FIG. 11 illustrates a first example of the size of an image generated under the first control.
Figure 12:
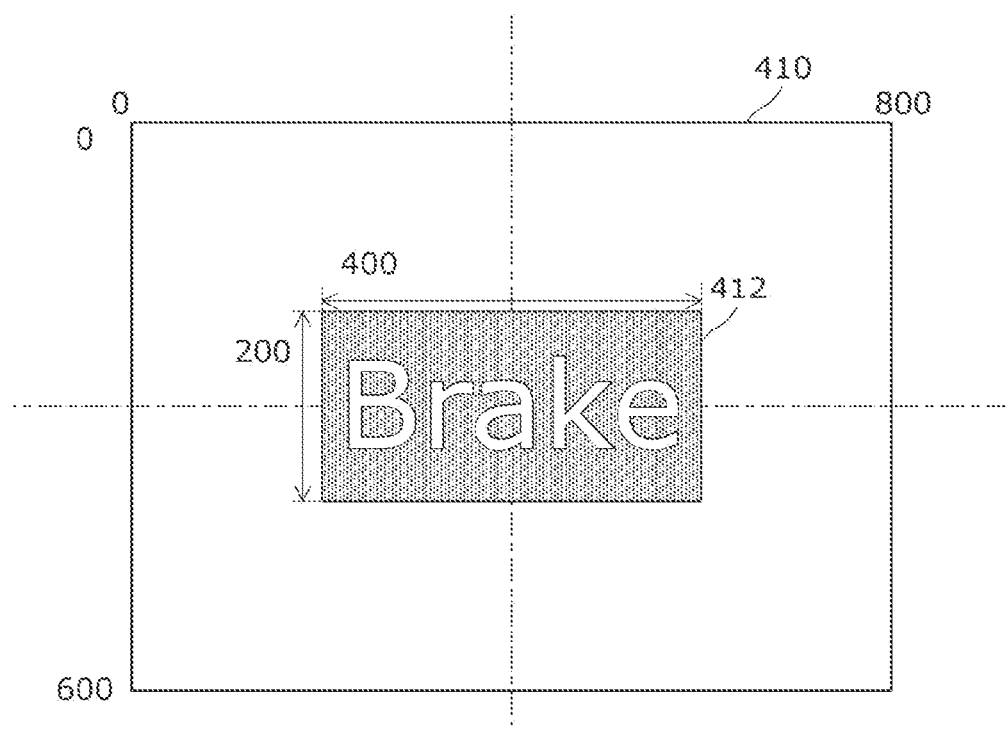
FIG. 12 illustrates a first example of the size of an image generated under the second control.

FIG. 11 illustrates a first example of the size of the image generated under the first control. FIG. 12 illustrates a first example of the size of the image generated under the second control.

FIG. 11 and FIG. 12 illustrate examples of a priority image whose priority of being displayed to the user is set higher than other images. FIG. 11 and FIG. 12 illustrate image region 410 which is the maximum size that can be projected onto screen 130, and priority images 411 and 412, respectively, in image region 410. Image region 410 shown here is used in the control of the laser light by light source 110. The values from 0 to 800 on the horizontal axis correspond to time required per unit amount of scanning by scanner 120. The values from 0 to 600 on the vertical axis correspond to the number of raster scan stages in the vertical axial direction of the scanning by scanner 120.

The priority image is, for example, an image for displaying a warning to the user, and is an image for prompting the user to perform an emergency maneuver, such as apply the brake. The size of priority image 412 generated by controller 100 in the second control is larger than the size of priority image 411 generated by controller 100 in the first control in both the horizontal and vertical axial directions, even if the image to be displayed is the same type as in the first control. More specifically, the size of priority image 412 is enlarged to twice the size of priority image 411 in both the horizontal and vertical axial directions.

Accordingly, even when the temperature of light source 110 is a temperature at which sufficient light output is difficult to obtain, the density of laser light per unit amount of scanning can be effectively increased by reducing the amplitude of the scanning by scanner 120 in both the horizontal and vertical axial directions. The brightness of a priority image, such as an image for displaying a warning, which is displayed in the center, can be effectively inhibited from being reduced.

The enlargement ratio of the image is the reciprocal of the reduction ratio of the amplitude to be reduced. In the second control, controller 100 enlarges, with reference to the center of priority image 411 generated under the first control, the size of priority image 412 in both the horizontal and vertical axial directions. In other words, the entirety of priority image 412 overlaps priority image 411, including the center of priority image 411, and is larger than priority image 411 in both the horizontal and vertical axial directions.

SECOND EXAMPLE

Next, a second example will be given.

Figure 13:
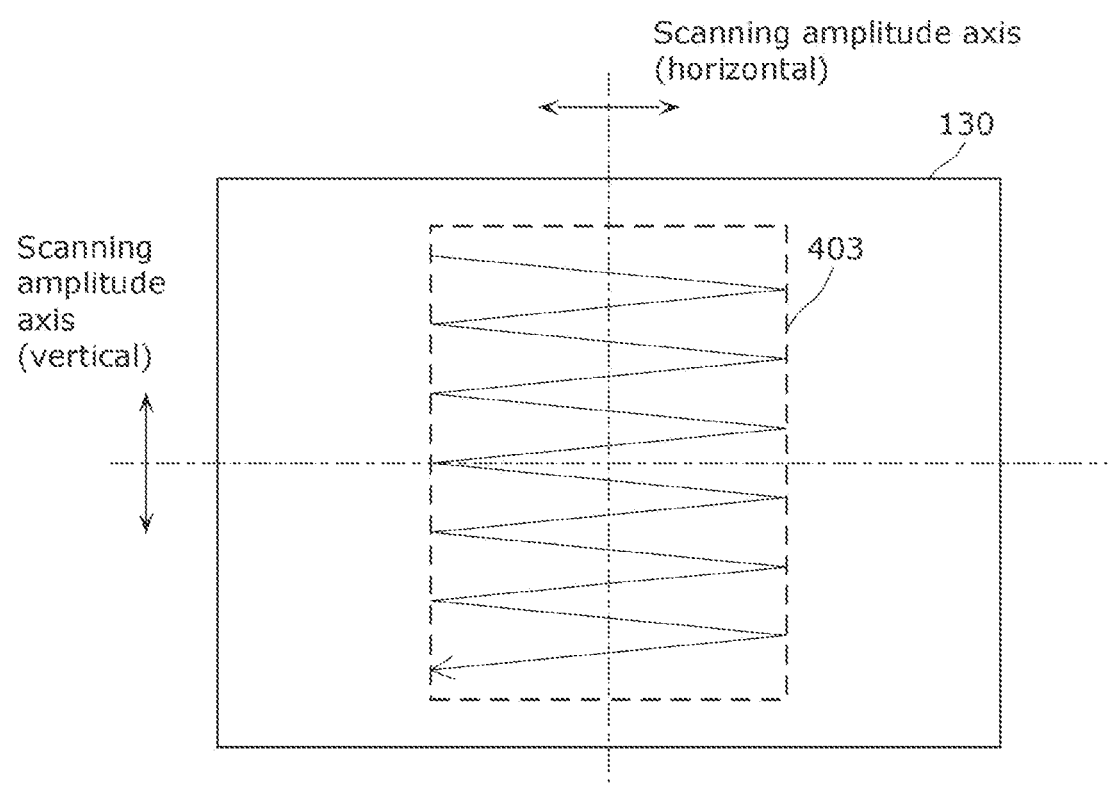
FIG. 13 illustrates a second example of the amplitude of the scanning by the scanner under the second control.

FIG. 13 illustrates a second example of the amplitude of the scanning by the scanner under the second control. Note that in the second example, the amplitude of the scanning by the scanner under the first control is the same as illustrated in FIG. 9.

In the second example, the size of region 403 corresponding to the amplitude under the second control is smaller than the size of region 401 corresponding to the amplitude under the first control, and is, for example, half the size of region 401 in the horizontal axial direction of the scanning. Note that the ratio of reduction is not limited to one half, and may be two thirds, three fourths, or any other ratio less than one. In the second control, controller 100 causes scanner 120 to reduce, with reference to the center of the region in which scanner 120 scans the laser light, the amplitude of the biaxial scanning in the horizontal axial direction thereof to a smaller value than in the first control. In other words, the entirety of region 403 of screen 130 in which scanner 120 scans the laser light in the second control overlaps region 401 of screen 130 in which scanner 120 scans the laser light in the first control, including the center of region 401, is smaller than region 402 in the horizontal axial direction, and is the same size as region 402 in the vertical axial direction.

Figure 14:
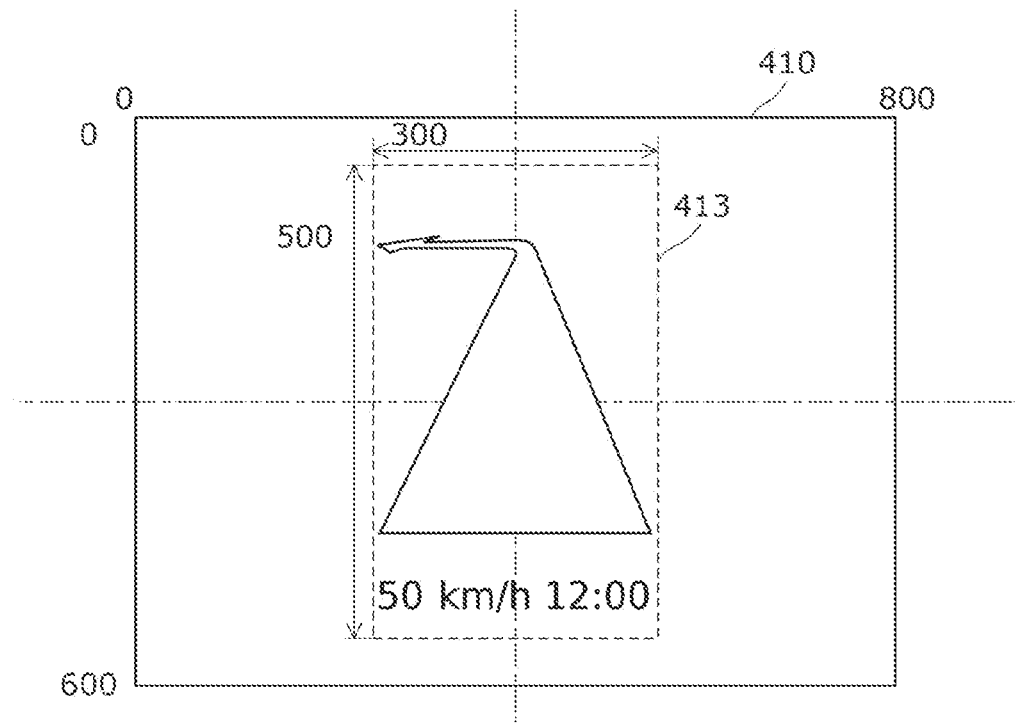
FIG. 14 illustrates a second example of the size of an image generated under the first control.
Figure 15:
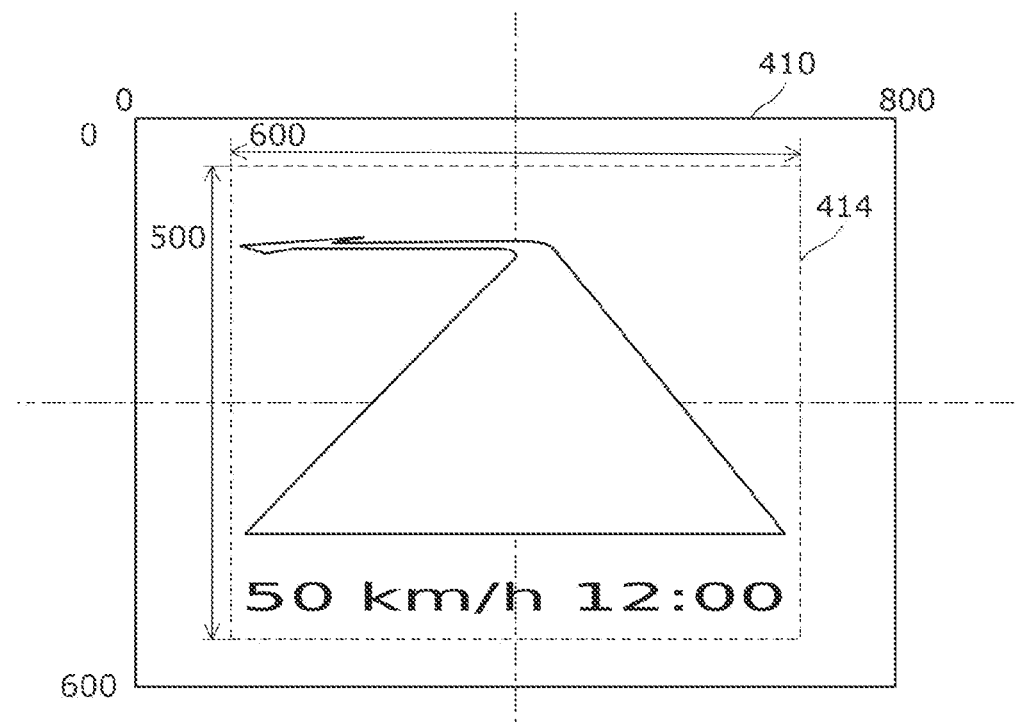
FIG. 15 illustrates a second example of the size of an image generated under the second control.

FIG. 14 illustrates a second example of the size of the image generated under the first control. FIG. 15 illustrates a second example of the size of the image generated under the second control.

FIG. 14 and FIG. 15 illustrate examples of always-displayed images which are set to be always displayed while vehicle 300 is operating. In FIG. 14 and FIG. 15, image region 410 is displayed, just like in FIG. 11 and FIG. 12, and always-displayed images 413 and 414 are respectively displayed in image region 410.

An always-displayed image is, for example, an image displaying the operating status of vehicle 300, such as an image displaying a travel route of vehicle 300, an image displaying the driving speed of vehicle 300, an image displaying the fuel meter of vehicle 300, or an image displaying the battery power remaining in vehicle 300. The size of always-displayed image 414 generated by controller 100 in the second control is larger than the size of always-displayed image 413 generated by controller 100 in the first control in the horizontal axial direction, even if the image to be displayed is the same type as in the first control, More specifically, the size of always-displayed image 414 is enlarged to twice the size of always-displayed image 413 in the horizontal axial direction.

Accordingly, even when the temperature of light source 110 is a temperature at which sufficient light output is difficult to obtain, the density of laser light per unit amount of scanning can be effectively increased by reducing the amplitude of the scanning by scanner 120 in the horizontal axial direction. Accordingly, since the virtual image can be displayed across the entire vertical axis of the region, it is possible to effectively inhibit a reduction in brightness of an always-displayed image, such as an image displaying the operating status of the moving body, which is often displayed in the lower part of display region D, with minimal change in size to the always-displayed image.

The enlargement ratio of the image is the reciprocal of the reduction ratio of the amplitude to be reduced, just like in the first example. In the second control, controller 100 enlarges, with reference to the center of always-displayed image 413 generated under the first control, the size of always-displayed image 414 in the horizontal axial direction. In other words, the entirety of always-displayed image 414 overlaps always-displayed image 413, including the center of always-displayed image 413, and is larger than always-displayed image 413 in the horizontal axial direction.

THIRD EXAMPLE

Next, a third example will be given.

Figure 16:
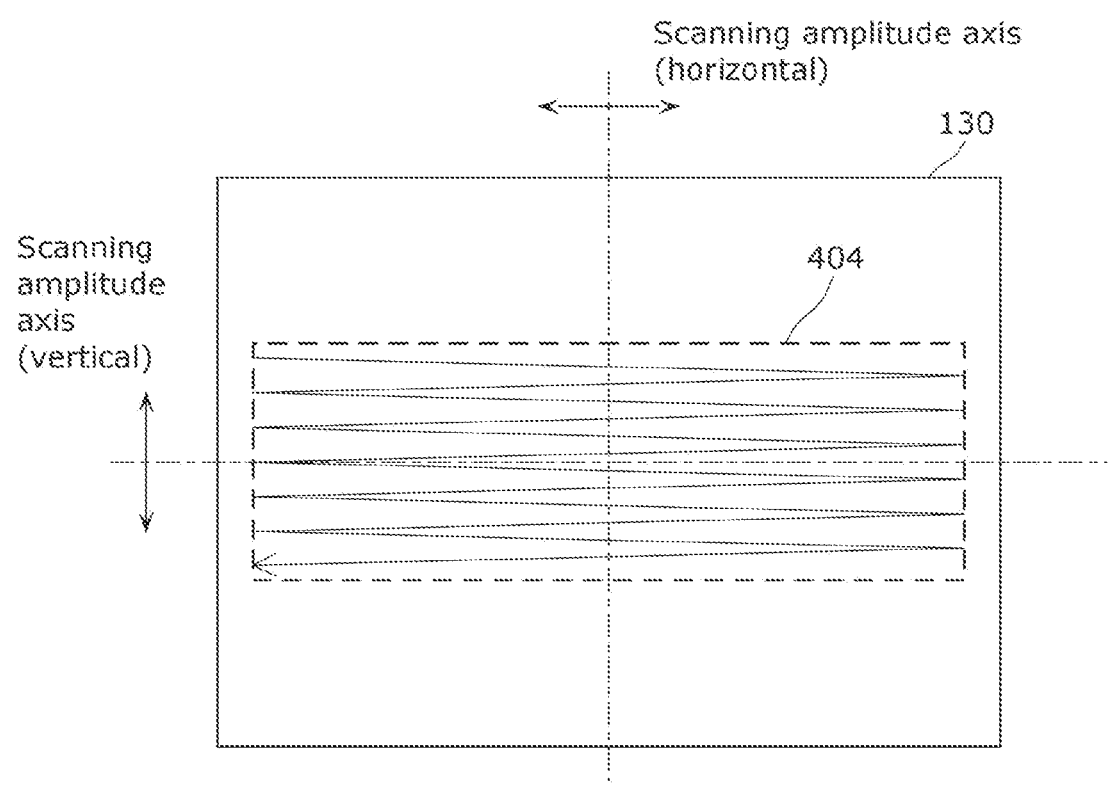
FIG. 16 illustrates a third example of the amplitude of the scanning by the scanner under the second control.

FIG. 16 illustrates a third example of the amplitude of the scanning by the scanner under the second control. Note that in the third example, the amplitude of the scanning by the scanner under the first control is the same as illustrated in FIG. 9.

In the third example, the size of region 404 corresponding to the amplitude under the second control is smaller than the size of region 401 corresponding to the amplitude under the first control, and is, for example, half the size of region 401 in the vertical axial direction of the scanning. Note that the ratio of reduction is not limited to one half, and may be two thirds, three fourths, or any other ratio less than one. In the second control, controller 100 causes scanner 120 to reduce, with reference to the center of the region in which scanner 120 scans the laser light, the amplitude of the biaxial scanning in the vertical axial direction thereof to a smaller value than in the first control. In other words, the entirety of region 404 of screen 130 in which scanner 120 scans the laser light in the second control overlaps region 401 of screen 130 in which scanner 120 scans the laser light in the first control, including the center of region 401, is smaller than region 402 in the horizontal axial direction, and is the same size as region 402 in the vertical axial direction.

Figure 17:
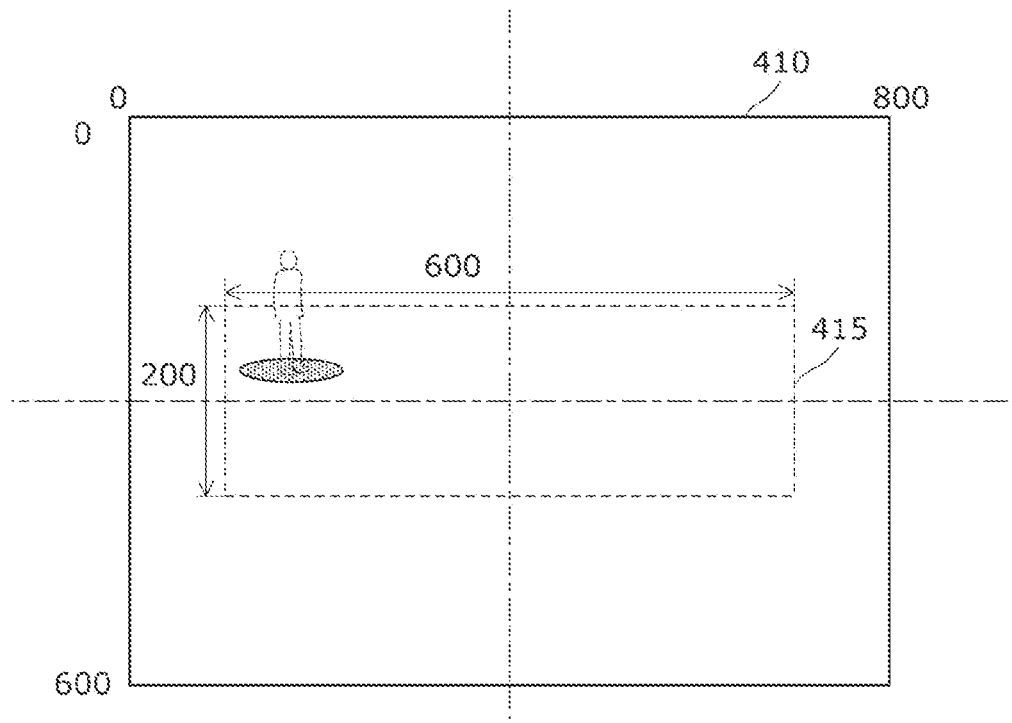
FIG. 17 illustrates a third example of the size of an image generated under the first control.
Figure 18:
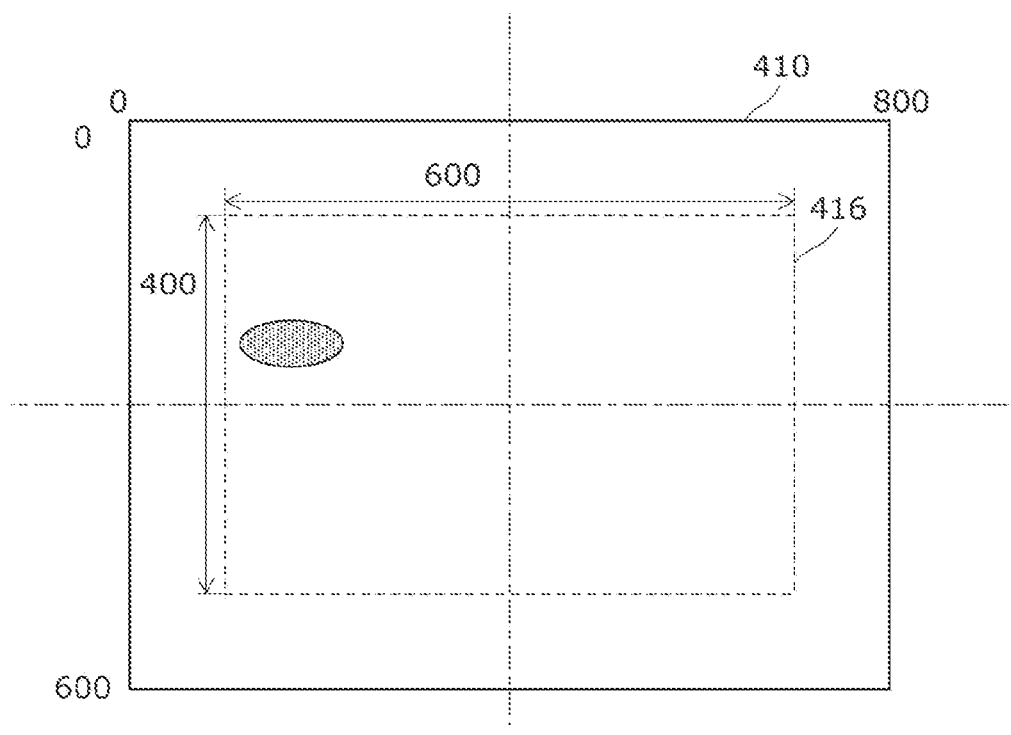
FIG. 18 illustrates a third example of the size of an image generated under the second control.

FIG. 17 illustrates a third example of the size of the image generated under the first control. FIG. 18 illustrates a third example of the size of the image generated under the second control.

FIG. 17 and FIG. 18 each illustrate an example of a surrounding area image which is set to be displayed offset toward one horizontal axis end of the region of screen 130 scanned by scanner 120 when the sensing information indicates a temperature within the given temperature range. In FIG. 17 and FIG. 18, image region 410 is displayed, just like in FIG. 11 and FIG. 12, and surrounding area images 415 and 416 are respectively displayed in image region 410.

A surrounding area image is, for example, an image displaying an object located on the left or right of the course of travel of vehicle 300. Here, the object is a person, vehicle, obstacle or road sign or the like. The size of surrounding area image 416 generated by controller 100 in the second control is larger than the size of surrounding area image 415 generated by controller 100 in the first control in the vertical axial direction, even if the image to be displayed is the same type as in the first control. More specifically, the size of surrounding area image 416 is enlarged to twice the size of surrounding area image 415 in the vertical axial direction.

Accordingly, even when the temperature of light source 110 is a temperature at which sufficient light output is difficult to obtain, the density of laser light per unit amount of scanning can be effectively increased by reducing the amplitude of the scanning by scanner 120 in the vertical axial direction. Accordingly, it is possible to effectively inhibit a reduction in brightness of a surrounding area image, such as an image illustrating an object to the left or right of the course of travel of the moving body, which is easy to display on the left and right ends, with minimal change in size to the surrounding area image.

The enlargement ratio of the image is the reciprocal of reduction ratio of the amplitude to be reduced, just like in the first and second examples. In the second control, controller 100 enlarges, with reference to the center of surrounding area image 415 generated under the first control, the size of surrounding area image 416 in the vertical axial direction. In other words, the entirety of surrounding area image 416 overlaps surrounding area image 415, including the center of surrounding area image 415, and is larger than surrounding area image 415 in the vertical axial direction.

[1-3. Operations of Video Display System]

Next, operations performed by the video display system will be described.

Figure 19:
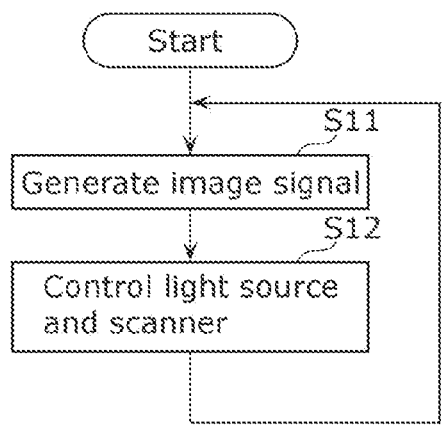
FIG. 19 is a flow chart illustrating one example of basic operations performed by the video display system.

FIG. 19 is a flow chart illustrating one example of basic operations performed by the video display system.

Controller 100 generates an image signal indicating an image to be projected onto a screen for displaying a virtual image to a user of vehicle 300 (S11).

Next, controller 100 controls light source 110 and scanner 120 in accordance with the generated image signal (S12). Controller 100 both controls light source 110 to cause light source 110 to emit laser light and controls scanner 120 to cause the laser light to be biaxially scanned onto screen 130 to project the image for displaying the virtual image to the user of vehicle 300 onto screen 130.

Next, amplitude adjustment control performed while the video display system is performing its basic operations will be described.

Figure 20:
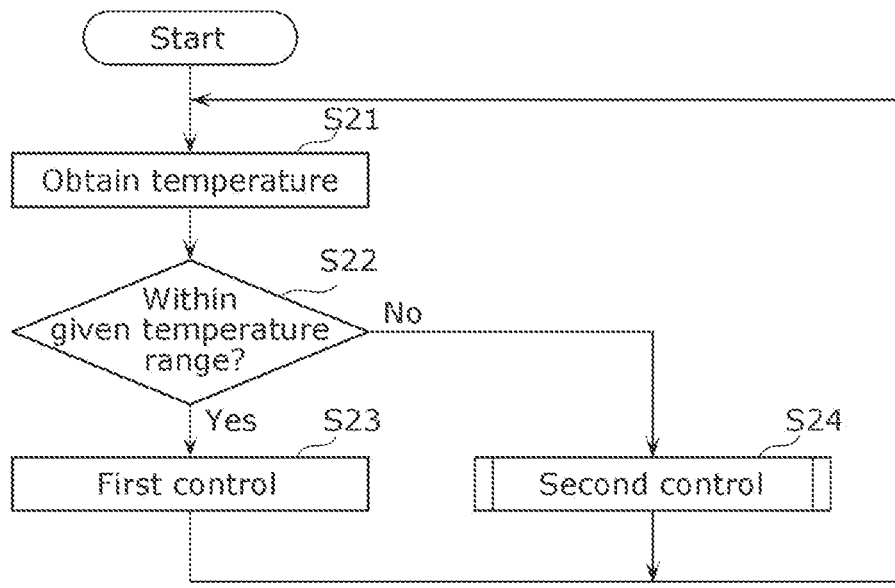
FIG. 20 is a flow chart illustrating a first example of amplitude adjustment control performed by the video display system.

FIG. 20 is a flow chart illustrating a first example of amplitude adjustment control performed by the video display system.

Controller 100 obtains the temperature of light source 110 detected by temperature sensor 140 (S21).

Controller 100 determines whether the obtained temperature of light source 110 is within a given temperature range or not (S22).

When controller 100 determines that the temperature of light source 110 is within the given temperature range (Yes in S22), controller 100 performs the first control (S23).

However, when controller 100 determines that the temperature of light source 110 is outside the given temperature range (No in S22), controller 100 performs the second control (S24).

Figure 21:
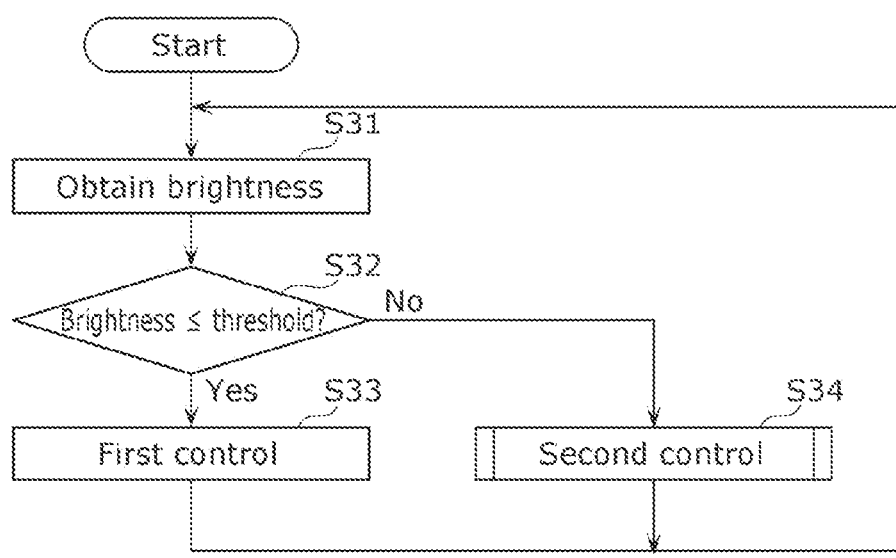
FIG. 21 is a flow chart illustrating a second example of amplitude adjustment control performed by the video display system.

FIG. 21 is a flow chart illustrating a second example of amplitude adjustment control performed by the video display system.

Controller 100 obtains the brightness of the external environment of vehicle 300 detected by illuminance sensor 150 (S31).

Controller 100 determines whether the obtained brightness of the external environment of vehicle 300 is less than or equal to a given threshold or not (S32).

When controller 100 determines that the brightness of the external environment of vehicle 300 is less than or equal to the given threshold range (Yes in S32), controller 100 performs the first control (S33).

However, when controller 100 determines that the brightness of the external environment of vehicle 300 is greater than the given threshold range (No in S32), controller 100 performs the second control (S34).

Note that the first and second controls may be performed in parallel in the amplitude adjustment control. In such cases, the second control is performed when step S22 is determined to be "No" or when step S32 is determined to be "No".

FIG. 22 is a flow chart illustrating one example of the second control performed by the video display system.

In the second control, controller 100 determines whether the generated image includes a priority image or not (S41).

When controller 100 determines that the generated image includes a priority image (Yes in S41), controller 100 reduces the amplitude of the scanning in both the horizontal and vertical axial directions thereof and generates an image with enlarged horizontal and vertical axis dimensions (S42). In other words, the second control according to the first example described with reference to FIG. 9 through FIG. 12 is performed.

However, when controller 100 determines that the generated image does not include a priority image (No in S41), controller 100 determines whether the generated image includes a surrounding area image or not (S43).

When controller 100 determines that the generated image includes a surrounding area image (Yes in S43), controller 100 reduces the amplitude of the scanning in the vertical axial direction thereof and generates an image with an enlarged vertical axis dimension (S44). In other words, the second control according to the third example described with reference to FIG. 9 and FIG. 16 through FIG. 18 is performed.

However, when controller 100 determines that the generated image does not include a surrounding area image (No in S43), controller 100 reduces the amplitude of the scanning in the horizontal axial direction thereof and generates an image with an enlarged horizontal axis dimension (S45). In other words, the second control according to the second example described with reference to FIG. 9 and FIG. 13 through FIG. 15 is performed.

Note that the second control described with reference to FIG. 22 need not be performed; it is sufficient if the second control according to any one of the first, second, or third example is performed.

[1-4. Advantageous Effects, etc.]

With video display system 10 according to this embodiment, when the sensing information from temperature sensor 140 indicates a temperature outside a given temperature range, controller 100 causes scanner 120 to reduce the amplitude of the biaxial scanning in at least one axial direction thereof to a smaller value than when the sensing information indicates a temperature within the given temperature range. Accordingly, even when the temperature of light source 110 is a temperature at which sufficient light output is difficult to obtain, the density of laser light per unit amount of scanning can be increased by reducing the amplitude of the scanning by scanner 120. This restores the brightness of the virtual image, making it possible to display a clear image. Moreover, since the brightness of the image can be adjusted without performing temperature adjustment, image brightness adjustment that is responsive can be achieved.

Moreover, in video display system 10 according to the this embodiment, when the sensing information indicates a temperature outside the given temperature range, controller 100 generates the image by enlarging an image of the same type displayed at the same position in the virtual image regardless of the temperature indicated by the sensing information in an axial direction in which the amplitude of the biaxial scanning is to be reduced by the scanner to a greater size than when the sensing information indicates a temperature within the given temperature range. Accordingly, even when the brightness of the virtual image is restored by reducing the amplitude of the scanning by scanner 120, the size of the virtual image can be inhibited from decreasing.

Moreover, in video display system 10 according to this embodiment, the enlargement ratio of the generated image is the reciprocal of the reduction ratio of the amplitude to be reduced. Accordingly, even when the brightness of the virtual image is restored by reducing the amplitude of the scanning by scanner 120, the size of the virtual image can be made to be the same size as before the reduction of the amplitude.

With video display system 10 according to this embodiment, when the sensing information from illuminance sensor 150 indicates the first brightness, controller 100 causes scanner 120 to reduce the amplitude of the biaxial scanning in at least one axial direction thereof to a smaller value than when the sensing information indicates a second brightness darker than the first brightness. Accordingly, even in conditions in which the external environment is, for example, brighter than a given threshold and the contrast between the virtual image and the real-world background tends to decrease, the density of laser light per unit amount of scanning can be increased by reducing the amplitude of the scanning by scanner 120. This restores the brightness of the virtual image, making it possible to display a clear image. Accordingly, it is possible to inhibit a reduction in visibility of the virtual image by the user.

[1-5. Variations]

In the above embodiment, the brightness of the external environment of vehicle 300 is detected using illuminance sensor 150, but the present disclosure is not limited to the use of illuminance sensor 150. For example, a device including an image sensor such as a camera may be used to detect the brightness of the external environment of vehicle 300.

In the above embodiment, one of the first control and the second control is selectively performed according to whether the temperature detected by temperature sensor 140 is within a given temperature range or not. In other words, in the above embodiment, two-stage control is performed depending on two-stage condition satisfaction, but the present disclosure is not limited to this example. For example, whether a multi-stage condition is satisfied or not may be determined, and multi-stage control may be performed accordingly.

A multi-stage condition includes, for example, a first temperature range, a second temperature range, and a third temperature range. The first temperature range is a temperature range in which sufficient light is output from light source 110. The second temperature range is a temperature range in which less light is output from light source 110 than at temperatures in the first temperature range. The third temperature range is a temperature range in which less light is output from light source 110 than at temperatures in the second temperature range. The second temperature range is comprised of a temperature range of a first span of temperatures from the upper limit value of the first temperature range and a temperature range of a second span of temperatures from the lower limit value of first temperature range. The third temperature range is comprised of a temperature range higher than the upper limit value of the temperature range of the first span of temperatures of the second temperature range and a temperature range lower than the upper limit value of the temperature range of the second span of temperatures of the second temperature range.

In such cases, controller 100 performs first control when the temperature detected by temperature sensor 140 is within the first temperature range. When the temperature detected is within the second temperature range, controller 100 performs third control that reduces the amplitude of the scanning by scanner 120 to a smaller value than under the first control. In the third control, controller 100 may enlarge the image to be generated, just like in the second control described in the above embodiment. When the temperature detected is within the third temperature range, controller 100 performs fourth control that reduces the amplitude of the scanning by scanner 120 to a smaller value than under the third control. In the fourth control, controller 100 may enlarge the image to be generated, just like in the second control described in the above embodiment. In the fourth control, controller 100 generates an image that is enlarged to a larger size than the image generated under the third control.

In the above embodiment, both (i) control whereby one of the first control and the second control is selectively performed according to the temperature detected by temperature sensor 140, and (ii) control whereby one of the first control and the second control is selectively performed according to the brightness of the external environment detected by illuminance sensor 150 are performed, but only one may be performed.

[1-6. Other Comments]

Hereinbefore, a video display system according to an embodiment was described as an example of a technique disclosed in the present application, but the present disclosure is not limited to the embodiment. The techniques of the present disclosure are also applicable to embodiments arrived at by making various modifications, substitutions, additions, and omissions, as well as other embodiments. Moreover, new embodiments or variations are also possible by combining various elements described in the embodiment.

General or specific aspects of the present disclosure may be realized as a system, a method, an integrated circuit, a computer program, a non-transitory computer-readable recording medium such as a compact disc-read only memory (CD-ROM), or any given combination thereof.

For example, each of processing unit included in the video display system according to the above embodiment is typically realized as a large scale integrated (LSI) circuit. Each processing unit may be individually configured as a single chip, or some or all of the processing units may be collectively configured as a single chip.

Circuit integration is not limited to LSI; the processing units may be realized as dedicated circuits or generic processors. A field programmable gate array (FPGA) that is programmable after manufacturing of the LSI circuit, or a reconfigurable processor whose connections and settings regarding circuit cells in the LSI circuit are reconfigurable, may be used.

Each element in the above embodiment may be configured in the form of an exclusive hardware product, or may be realized by executing a software program suitable for the element. Each element may be realized by means of a program executing unit, such as a CPU or a processor, reading and executing the software program recorded on a recording medium such as a hard disk or a semiconductor memory.

The block diagrams illustrate one example of the division of functional blocks; a plurality of functional blocks may be realized as a single functional block, a single functional block may be broken up into a plurality of functional blocks, and part of one function may be transferred to another functional block. The functions of a plurality of functional blocks having similar functions may be processed by a single piece of hardware or software in parallel or by time-division.

Although a video display system according to one aspect has been described based on an embodiment, the present disclosure is not limited to this embodiment. Those skilled in the art will readily appreciate that various modifications may be made and that other embodiments may be obtained by combining elements of different embodiments without materially departing from the novel teachings and advantages of the subject matter of the present disclosure. Accordingly, all such modifications and other embodiments are included in the scope of one aspect.

Further Information about Technical Background to this Application

The disclosures of the following patent applications including specification, drawings and claims are incorporated herein by reference in their entirety: Japanese Patent Application No. 2019-065138 filed on Mar. 28, 2019, Japanese Patent Application No. 2019-065139 filed on Mar. 28, 2019, and PCT International Application No. PCT/JP2020/006756 filed on Feb. 20, 2020.

INDUSTRIAL APPLICABILITY

The present disclosure is applicable to, for example, a video display system and the like that are capable of inhibiting a reduction in visibility of a virtual image by a user.

The invention claimed is:

1. A video display system in a moving body that allows a user of the moving body to view, as a virtual image, an image projected on a screen, the video display system comprising:

the screen on which the image to be viewed by the user as the virtual image is projected;

a light source that emits laser light;

a scanner that projects the image onto the screen by biaxially scanning the laser light onto the screen; and a controller that: generates the image and controls the light source using an image signal for causing the image generated to be projected onto the screen by the laser light; and receives an input of sensing information measured using a sensor and indicating a brightness of an external environment of the moving body or a temperature of the light source, and controls the scanner in accordance with the sensing information input, wherein when the sensing information indicates a first brightness or a first temperature outside a given temperature range, the controller causes the scanner to reduce an amplitude of the biaxial scanning in at least one axial direction of the biaxial scanning to a smaller value than when the sensing information indicates a second brightness darker than the first brightness or a second temperature within the given temperature range, and when the sensing information indicates the first brightness or the first temperature outside the given temperature range, the controller generates the image by enlarging an image of a same type displayed at a same position in the virtual image, regardless of the first brightness or the first temperature indicated by the sensing information, in the axial direction, in which the amplitude of the biaxial scanning is to be reduced by the scanner, to a greater size than when the sensing information indicates the second brightness or the second temperature within the given temperature range.

2. The video display system according to claim 1, wherein an enlargement ratio of the image generated is a reciprocal of a reduction ratio of the amplitude to be reduced.

3. The video display system according to claim 1, wherein when the sensing information indicates the first brightness or the first temperature outside the given temperature range, the controller causes the scanner to reduce, with reference to a center of a region in which the scanner scans the laser light, the amplitude of the biaxial scanning in both a horizontal axial direction and a vertical axial direction of the biaxial scanning to the smaller value than when the sensing information indicates the second brightness or the second temperature within the given temperature range, and the image to be projected onto the screen includes a priority image whose priority of being displayed to the user of the moving body is set higher than other images.

4. The video display system according to claim 3, wherein the priority image is for displaying a warning to the user.

5. The video display system according to claim 1, wherein when the sensing information indicates the first temperature outside the given temperature range, the controller causes the scanner to reduce, with reference to a horizontal center of a region in which the scanner scans the laser light, the amplitude of the biaxial scanning in a horizontal axial direction of the biaxial scanning to the smaller value than when the sensing information indicates the second temperature within the given temperature range, and the image to be projected onto the screen includes an always-displayed image set to be always displayed while the moving body is operating.

6. The video display system according to claim 5, wherein the always-displayed image displays an operating status of the moving body.

7. The video display system according to claim 1, wherein when the sensing information indicates the first brightness or the first temperature outside the given temperature range, the controller causes the scanner to reduce, with reference to a vertical center of a region in which the scanner scans the laser light, the amplitude of the biaxial scanning in a vertical axial direction of the biaxial scanning to a smaller value than when the sensing information indicates the second brightness or the second temperature within the given temperature range, and the image to be projected onto the screen includes a surrounding area image which is set to be displayed offset toward one horizontal axis end of a region of the screen scanned by the scanner when the sensing information indicates the second brightness or the second temperature within the given temperature range.

8. The video display system according to claim 7, wherein the surrounding area image displays an object located left or right of a course of travel of the moving body.

9. A moving body including the video display system according to claim 1.

10. A video display method executed in a video display system in a moving body that allows a user of the moving body to view, as a virtual image, an image projected on a screen, the video display method comprising:

generating an image signal indicating the image to be projected onto the screen;

emitting laser light in accordance with the image signal generated;

projecting the image onto the screen by biaxially scanning the laser light onto the screen, the image being viewed by the user of the moving body as the virtual image;

obtaining sensing information indicating a brightness of an external environment of the moving body measured using a sensor or a temperature of a light source that emits the laser light measured using a sensor;

when the sensing information indicates a first brightness or a first temperature outside a given temperature range, reducing an amplitude of the biaxial scanning in at least one axial direction of the biaxial scanning to a smaller value than when the sensing information indicates a second brightness darker than the first brightness or a second temperature within the given temperature range; and when the sensing information indicates the first brightness or the first temperature outside the given temperature range, enlarging an image of a same type displayed at a same position in the virtual image, regardless of the first brightness or the first temperature indicated by the sensing information, in the axial direction, in which the amplitude of the biaxial scanning is to be reduced by the scanner, to a greater size than when the sensing information indicates the second brightness or the second temperature within the given temperature range.

* * * * *